(12) United States Patent
Lee

(10) Patent No.: US 11,618,043 B2
(45) Date of Patent: Apr. 4, 2023

(54) FLOW RESTRICTING AND DIVERTING MANIFOLD FOR MULTIPLE FUNCTION SHOWERHEAD SYSTEMS

(71) Applicant: Delta Faucet Company, Indianapolis, IN (US)

(72) Inventor: David Lee, Westfield, IN (US)

(73) Assignee: Delta Faucet Company, Indianapolis, IN (US)

( * ) Notice: Subject to any disclaimer, the term of this patent is extended or adjusted under 35 U.S.C. 154(b) by 321 days.

(21) Appl. No.: 16/985,500

(22) Filed: Aug. 5, 2020

(65) Prior Publication Data

US 2021/0039118 A1     Feb. 11, 2021

Related U.S. Application Data

(60) Provisional application No. 62/884,806, filed on Aug. 9, 2019.

(51) Int. Cl.
*B05B 1/18* (2006.01)
*E03C 1/04* (2006.01)
*F16K 11/22* (2006.01)

(52) U.S. Cl.
CPC ............ *B05B 1/185* (2013.01); *E03C 1/0405* (2013.01); *E03C 1/0408* (2013.01); *F16K 11/22* (2013.01)

(58) Field of Classification Search
CPC .. B05B 1/16; B05B 1/18; B05B 1/185; E03C 1/025; E03C 2001/026; E03C 1/0405; E03C 1/0408; F16K 11/22
See application file for complete search history.

(56) References Cited

U.S. PATENT DOCUMENTS

| | | | |
|---|---|---|---|
| 3,920,185 A | 11/1975 | Kwok | |
| 5,199,639 A | 4/1993 | Kobayashi et al. | |
| 5,433,384 A | 7/1995 | Chan et al. | |
| 7,000,854 B2 | 2/2006 | Malek et al. | |
| 7,900,295 B2 | 3/2011 | Lev | |
| 8,490,891 B2 | 7/2013 | Chen | |
| 8,632,023 B2 | 1/2014 | Miller et al. | |
| 8,876,023 B2 | 11/2014 | Peel et al. | |
| 9,050,612 B2 | 6/2015 | Miller et al. | |
| 9,359,748 B1 | 6/2016 | Lamy et al. | |
| 9,632,514 B2 | 4/2017 | Marty et al. | |

(Continued)

FOREIGN PATENT DOCUMENTS

| CN | 104226502 | 12/2014 |
|---|---|---|
| CN | 207478849 | 6/2018 |

OTHER PUBLICATIONS

Combination Shower Head and Hand Shower, In2ition® Two-in-One Shower, Delta Faucet Company, retrieved from https://www.deltafaucet.com/design-innovation/innovations/shower/in2ition-two-in-one-shower#anchor-products on May 21, 2019.

(Continued)

*Primary Examiner* — Darren W Gorman
(74) *Attorney, Agent, or Firm* — Bose McKinney & Evans LLP

(57) ABSTRACT

A showerhead system is operable in different discharge modes and a combination of discharge modes. The showerhead system includes a manifold that restricts the total water discharge rate to a threshold value regardless of whether the showerhead operates in a single discharge mode or a combination of discharge modes.

21 Claims, 19 Drawing Sheets

(56) References Cited

U.S. PATENT DOCUMENTS

| | | |
|---|---|---|
| 9,770,726 B2 | 9/2017 | Zhou et al. |
| 10,245,606 B2 | 4/2019 | Chiu et al. |
| 2013/0239320 A1 | 9/2013 | Aihara et al. |
| 2014/0319248 A1 | 10/2014 | Kinle |
| 2015/0090811 A1* | 4/2015 | Wu ................ B05B 1/169 |
| | | 137/625.6 |
| 2015/0238984 A1 | 8/2015 | Lee |
| 2015/0369382 A1* | 12/2015 | Paul ................ F16K 35/06 |
| | | 422/38 |
| 2016/0184840 A1 | 6/2016 | Yu |
| 2017/0128960 A1* | 5/2017 | D'Urso ............. B05B 12/02 |
| 2018/0169675 A1 | 6/2018 | Yu et al. |
| 2018/0193851 A1 | 7/2018 | L'Henaff et al. |
| 2018/0195257 A1 | 7/2018 | Hu et al. |
| 2018/0318886 A1 | 11/2018 | Libbrecht et al. |
| 2019/0093324 A1 | 3/2019 | Backus |

OTHER PUBLICATIONS

Spectra+ eTouch™ 4-Function Shower Head, American Standard, retrieved from https://www.americanstandard-us.com/bathroom/shower-faucets/spectra-plus-etouch-4-function-shower-head-18-gpm-32329 on May 26, 2019.

Hansgrohe Select: Water at the touch of a button, Hansgrohe USA, retrieved from https://www.hansgrohe-usa.com/bath/planning/technologies/select on May 26, 2019.

Delta Faucet Company, U.S. Appl. No. 16/751,714, Multiple Function Shower Systems Facilitating Low Actuation Force Mode Switching, filed Jan. 24, 2020, 31 pgs.

Delta Faucet Company, U.S. Appl. No. 16/751,724, Multiple Function Shower Systems Including Consolidated Mode Switching Controls, filed Jan. 24, 2020, 32 pgs.

* cited by examiner

FLOW RESTRICTING AND DIVERTING MANIFOLD FOR MULTIPLE FUNCTION SHOWERHEAD SYSTEMS

CROSS-REFERENCE TO RELATED APPLICATION

The present application claims priority to U.S. Provisional Patent Application Ser. No. 62/884,806, filed Aug. 9, 2019, the disclosure of which is expressly incorporated herein by reference.

BACKGROUND AND SUMMARY OF THE DISCLOSURE

The present disclosure relates generally to multiple function showerheads and, more particularly, to multiple function showerhead systems including manifolds that restrict the total water discharge rate regardless of operating mode.

Multiple function showerheads operate in different modes, or selectively discharge different types of water streams (for example, a circular stream, a massaging stream, a soft stream, and the like), to suit different user preferences. Such showerheads are typically reconfigured to operate in different modes, or combinations of different modes, by manipulating a diverter. In some cases, the diverter is carried within the showerhead and manipulated by rotating one portion of the showerhead relative to another portion of the showerhead. For example, a diverter may be manipulated by rotating a first sprayface of the showerhead relative to a second sprayface, by rotating a spout housing of the showerhead relative to the sprayface, or by rotating a lever or knob carried by the showerhead. In some situations, however, it can be impractical to manipulate a showerhead including such a diverter, such as when the showerhead is mounted to a high ceiling. In these situations, it can be more practical to provide each showerhead "mode" with water from a different inlet conduit, which may in turn selectively receive water from a diverter mounted at a lower height (for example, a wall mounted diverter operated by rotating a lever or knob). In these situations, however, it can be difficult to maintain the total water discharge rate within regulation limits when operating in a combination of different discharges modes.

An illustrative showerhead system is operable in different discharge modes and a combination of discharge modes. Such a showerhead system includes a manifold that restricts the total water discharge rate to a threshold value regardless of whether the showerhead operates in a single discharge mode or a combination of discharge modes.

According to an illustrative embodiment of the present disclosure, a multiple function showerhead system includes a first supply conduit for selectively delivering water to a manifold, a second supply conduit for selectively delivering water to the manifold, a first spout outlet for selectively discharging water from the showerhead system, and a second spout outlet for selectively discharging water from the showerhead system. The manifold includes a first inlet configured to receive water from the first supply conduit, a second inlet configured to receive water from the second supply conduit, and a common passageway configured to receive water from both the first inlet and the second inlet. The manifold further includes a flow restricting device configured to receive water from the common passageway and configured to restrict a flow rate of water in the manifold. A first valve is configured to receive water from the flow restricting device. The first valve is actuatable to a first open position and a first closed position. In the first open position the first valve permits water to flow therethrough and in the first closed position the first valve inhibits water from flowing therethrough. A first manifold outlet is configured to receive water from the first valve upon actuation of the first valve to the first open position, and the first manifold outlet is configured to deliver water to the first spout outlet. A second valve is configured to receive water from the flow restricting device. The second valve is actuatable to a second open position and a second closed position. In the second open position the second valve permits water to flow therethrough and in the second closed position the second valve inhibits water from flowing therethrough. A second manifold outlet is configured to receive water from the second valve upon actuation of the second valve to the second open position, and the second manifold outlet is configured to deliver water to the second spout outlet.

According to another illustrative embodiment of the present disclosure, a multiple function showerhead system includes a first supply conduit for selectively delivering water to a manifold, a second supply conduit for selectively delivering water to the manifold, a first spout outlet for selectively discharging water from the showerhead system, and a second spout outlet for selectively discharging water from the showerhead system. The manifold includes a first inlet configured to receive water from the first supply conduit, a second inlet configured to receive water from the second supply conduit, and a common passageway configured to receive water from both the first inlet and the second inlet. The manifold further includes a flow restricting device configured to receive water from the common passageway and configured to restrict a flow rate of water in the manifold. A valve is configured to receive water from the flow restricting device, and the valve is actuatable to permit water to flow therethrough in a first position, a second position, and a third position. A first manifold outlet is configured to receive water from the valve upon actuation of the valve to the first position and the second position, and the first manifold outlet is configured to deliver water to the first spout outlet. A second manifold outlet is configured to receive water from the valve upon actuation of the valve to the second position and the third position, and the second manifold outlet is configured to deliver water to the second spout outlet.

According to another illustrative embodiment of the present disclosure, a showerhead system includes a first supply conduit for selectively delivering water to a manifold, a second supply conduit for selectively delivering water to the manifold, a first spout outlet for selectively discharging water from the showerhead system, and a second spout outlet for selectively discharging water from the showerhead system. The manifold includes a first inlet configured to receive water from the first supply conduit, a second inlet configured to receive water from the second supply conduit, and a common passageway configured to receive water from both the first inlet and the second inlet. A flow restrictor is configured to receive water from the common passageway and restrict a flow rate of water in the manifold. A first valve is configured to receive water from the flow restrictor, and the first valve is actuatable to a first actuated position from a first unactuated position. In the first actuated position the first valve permits water to flow therethrough and in the first unactuated position the first valve inhibits water from flowing therethrough. A first manifold outlet is configured to receive water from the first valve upon actuation of the first valve to the first actuated position, and the first manifold outlet is configured to deliver water to the first spout outlet. A second valve is configured to receive water from the flow restrictor, and the second valve is actuatable to a second actuated position from a second unactuated position. In the second actuated position the second valve permits water to flow therethrough and in the second unactuated position the second valve inhibits water from flowing therethrough. A second manifold outlet is configured to receive water from the second valve upon actuation of the second valve to the second actuated position, and the second manifold outlet is configured to deliver water to the second spout outlet.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
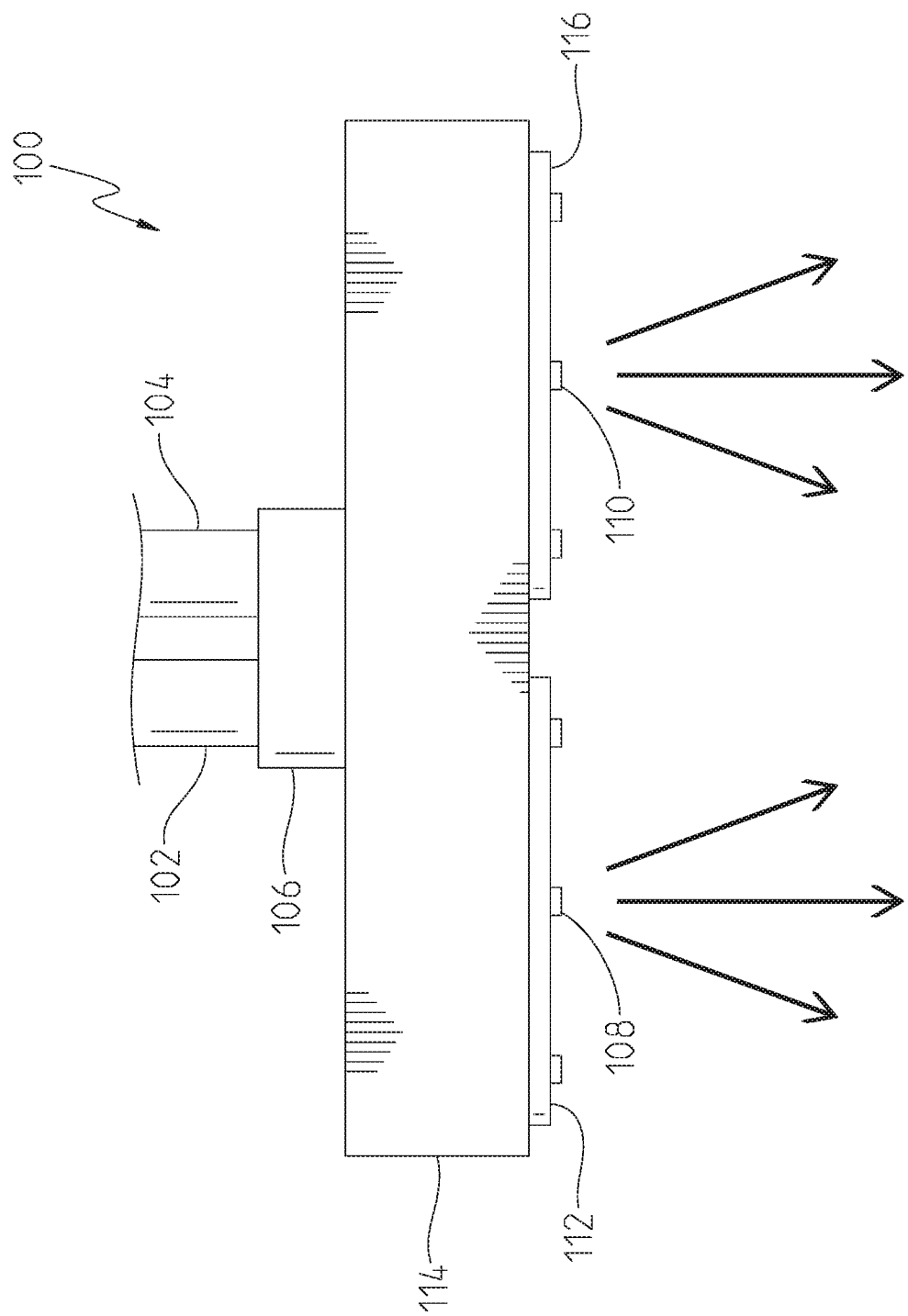
FIG. 1 is a side elevational view of an illustrative multiple function showerhead system of the present disclosure coupled to first and second water supply conduits.

For the purposes of promoting and understanding the principles of the present disclosure, reference will now be made to the embodiments illustrated in the drawings, which are described herein.

With reference to FIG. 1, an illustrative multiple function showerhead system 100 is shown coupled to a first water supply conduit 102 and a second water supply conduit 104, both of which may be conventional water supply pipes disposed within a building structure (such as a ceiling or a wall—not shown). The showerhead system 100 includes a flow restricting and diverting manifold 106 that couples to and receives water from the first water supply conduit 102 and the second water supply conduit 104. The manifold 106 selectively delivers water to one or more first spout outlets 108 and/or one or more second spout outlets 110, which are illustratively coupled to a first sprayface 112 of a showerhead housing or spout 114 and a second sprayface 116 of the showerhead spout 114, respectively. The first spout outlets 108 and the second spout outlets 110 are configured to discharge water from the showerhead system 100. As described in further detail below, the manifold 106 delivers water to the first spout outlets 108 when the manifold 106 receives water from the first water supply conduit 102, the manifold 106 delivers water to the second spout outlets 110 when the manifold 106 receives water from the second water supply conduit 104, and the manifold 106 delivers water to both the first spout outlets 108 and the second spout outlets 110 when the manifold 106 receives water from both the first water supply conduit 102 and the second water supply conduit 104. In each of these situations, the manifold 106 restricts the total water delivery rate to the showerhead spout 114, and accordingly the total water discharge rate from the showerhead spout 114, to a threshold value (for example, 1.0, 1.5, 2.0, 2.5, 3.0 gallons per minute (gpm), any other desired value, or any other required value (for example, in accordance with federal, state, or local regulations)).

Figure 2:
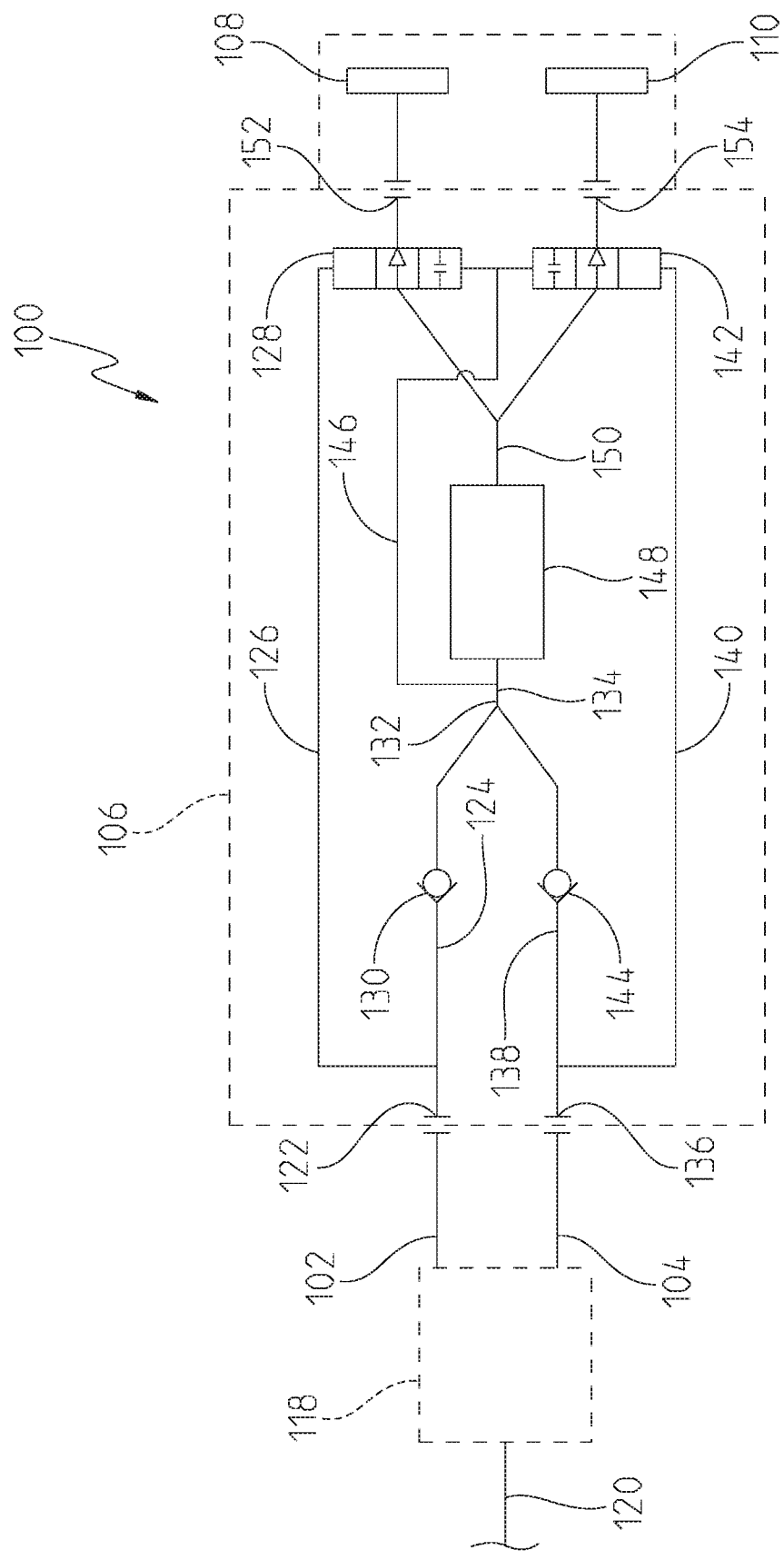
FIG. 2 is a schematic illustration of the showerhead system of FIG. 1, first and second water supply conduits, and a flow controller.

Referring now to FIG. 2, the showerhead system 100, the first water supply conduit 102, the second water supply conduit 104, a flow controller 118, and one or more primary water supply conduits 120 are schematically illustrated. The primary water supply conduit 120 may be, for example, a pipe disposed within a building structure (such as a wall—not shown) that receives and combines hot water and cold water received from a hot water source (not shown) and a cold water source (not shown), respectively. The flow controller 118 receives water from the primary water supply conduit 120 and is operable to selectively deliver water to the first water supply conduit 102 and/or the second water supply conduit 104. The flow controller 118 may be, for example, a manually-operated diverter disposed apart from the showerhead system 100. The flow controller 118 may include a mixing valve for mixing hot and cold water, or the mixing valve may be upstream of the flow controller 118. The flow controller 118 may be, for example, two separate mixing valves that lead with one outlet per valve, and both valves individually direct water to the showerhead system 100.

With continued reference to FIG. 2, illustrative components of the flow restricting and diverting manifold 106 will now be described, and operation of the manifold 106 will be described later with reference to other figures. The manifold 106 illustratively includes a first inlet 122 in fluid communication with the first water supply conduit 102. The first inlet 122 is in fluid communication with a first inlet passageway 124. The first inlet passageway 124 is in fluid communication with a first pilot line or passageway 126, which is in operable communication with a first valve 128 (illustratively, a two-position one-way valve) as described in further detail below. The first inlet passageway 124 is also in fluid communication with a first check valve 130. The first check valve 130 is in fluid communication with an upstream portion 132 of a common passageway 134. The flow restricting and diverting manifold 106 illustratively includes similar components for coupling to the second water supply conduit 104. That is, the manifold 106 illustratively includes a second inlet 136 in fluid communication with the second water supply conduit 104. The second inlet 136 is in fluid communication with a second inlet passageway 138. The second inlet passageway 138 is in fluid communication with a second pilot line or passageway 126, which is in operable communication with a second valve 142 (illustratively, a two-position one-way valve) as described in further detail below. The second inlet passageway 138 is also in fluid communication with a second check valve 144. The second check valve 144 is in fluid communication with the upstream portion 132 of the common passageway 134.

The upstream portion 132 of the common passageway 134 is in fluid communication with a common pilot passageway 146, which is in operable communication with both the first valve 128 and the second valve 142 as described in further detail below. The upstream portion 132 of the common passageway 134 is also in fluid communication with a flow restricting device 148. The flow restricting device 148 restricts the flow rate of water through the common passageway 134 and, as a result, the manifold 106 overall (for example, restricting to the flow rate of water to 1.0, 1.5, 2.0, 2.5, 3.0 gallons per minute (gpm), any other desired value, or any other required value (for example, in accordance with federal, state, or local regulations)). The flow restricting device 148 is in fluid communication with a downstream portion 150 of the common passageway 134. The downstream portion 150 of the common passageway 134 is in fluid communication with both the first valve 128 and the second valve 142. The first valve 128 is in fluid communication with a first manifold outlet 152, and the first manifold outlet 152 is in fluid communication with the first spout outlets 108. The second valve 142 is in fluid communication with a second manifold outlet 154, and the second manifold outlet 154 is in fluid communication with the second spout outlets 110.

Figure 3:
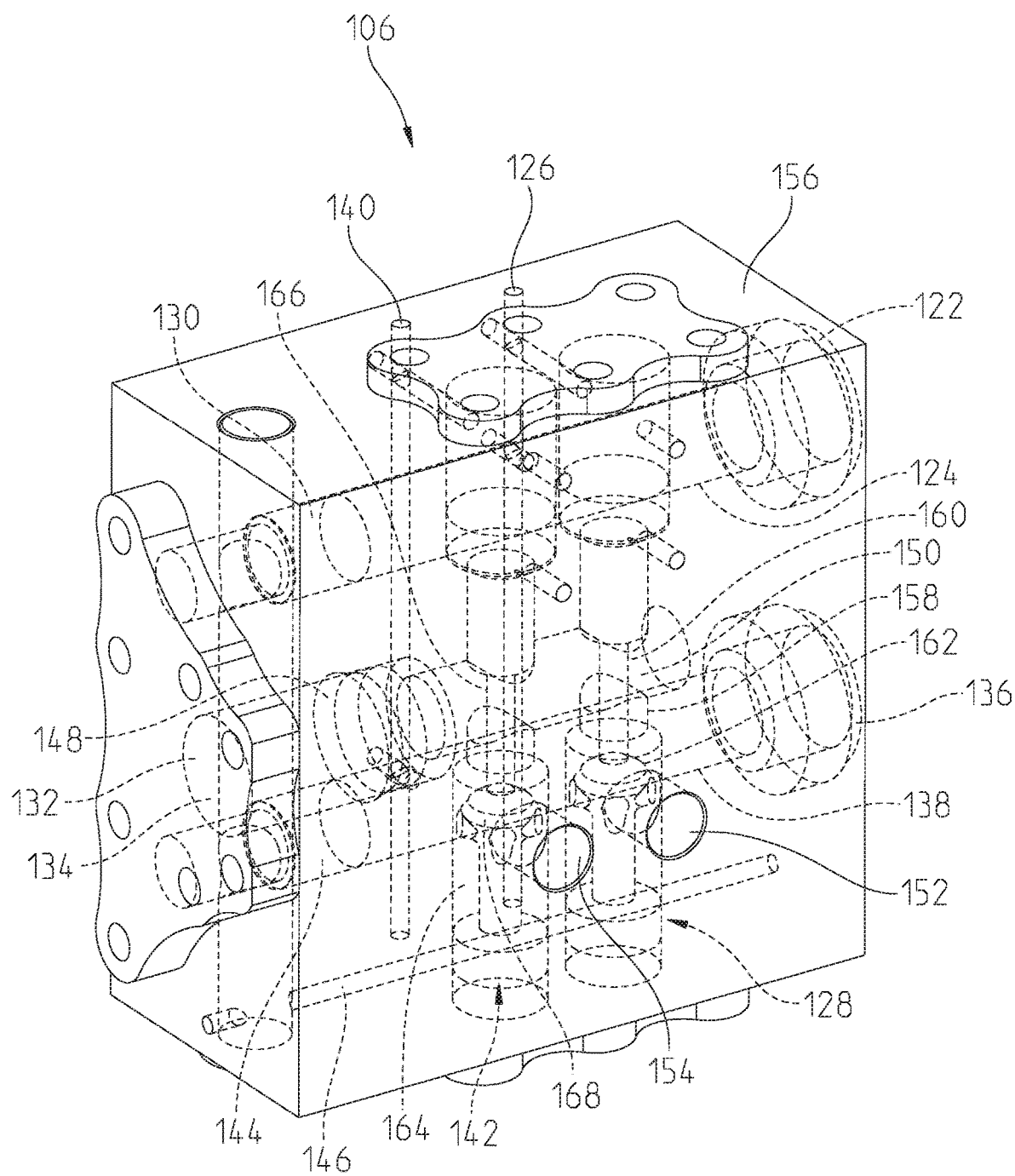
FIG. 3 is a perspective view of an illustrative flow restricting and diverting manifold of the showerhead system of FIG. 1, and a body of the manifold is illustrated with solid lines and internal components are illustrated with phantom lines.
Figure 4:
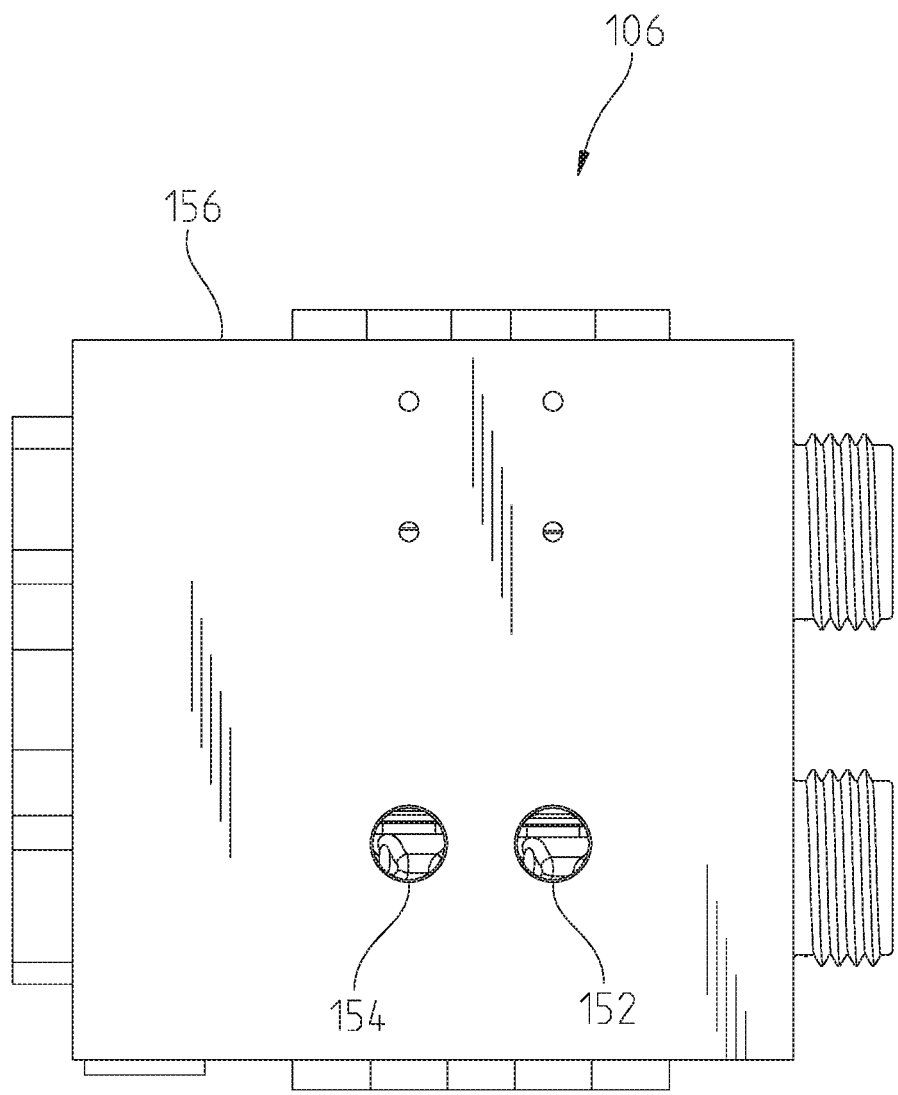
FIG. 4 is a rear view of the manifold of FIG. 3.

Referring now to FIGS. 3 and 4, the flow restricting and diverting manifold 106 of the showerhead system 100 is illustrated. In FIG. 3, a body 156 of the manifold 106 is illustrated with solid lines and internal components are illustrated with phantom lines. Generally, the manifold 106 includes the components described above. More specifically, the manifold 106 includes the first inlet 122, the first inlet passageway 124, the first pilot passageway 126, the first check valve 130, the second inlet 136, the second inlet passageway 138, the second pilot passageway 140, the second check valve 144, the upstream portion 132 of the common passageway 134, the common pilot passageway 146, the flow restricting device 148, the downstream portion 150 of the common passageway 134, the first valve 128, the first manifold outlet 152, the second valve 142, and the second manifold outlet 154. The first valve 128 illustratively includes a first valve chamber 158 that translatably carries a first valve piston 160, and the first valve piston 160 includes a first seat 162 that selectively permits water to flow through the first manifold outlet 152 and inhibits water from flowing through the first manifold outlet 152 (that is, the first valve piston 160 is translatable in the first valve chamber 158 to selectively open and close the first valve 128). Similarly, the second valve 142 illustratively includes a second valve chamber 164 that translatably carries a second valve piston 166, and the second valve piston 166 includes a second seat 168 that selectively permits water to flow through the second manifold outlet 154 and inhibits water from flowing through the second manifold outlet 154 (that is, the second valve piston 166 is translatable in the second valve chamber 164 to selectively open and close the second valve 142).

Figure 5:
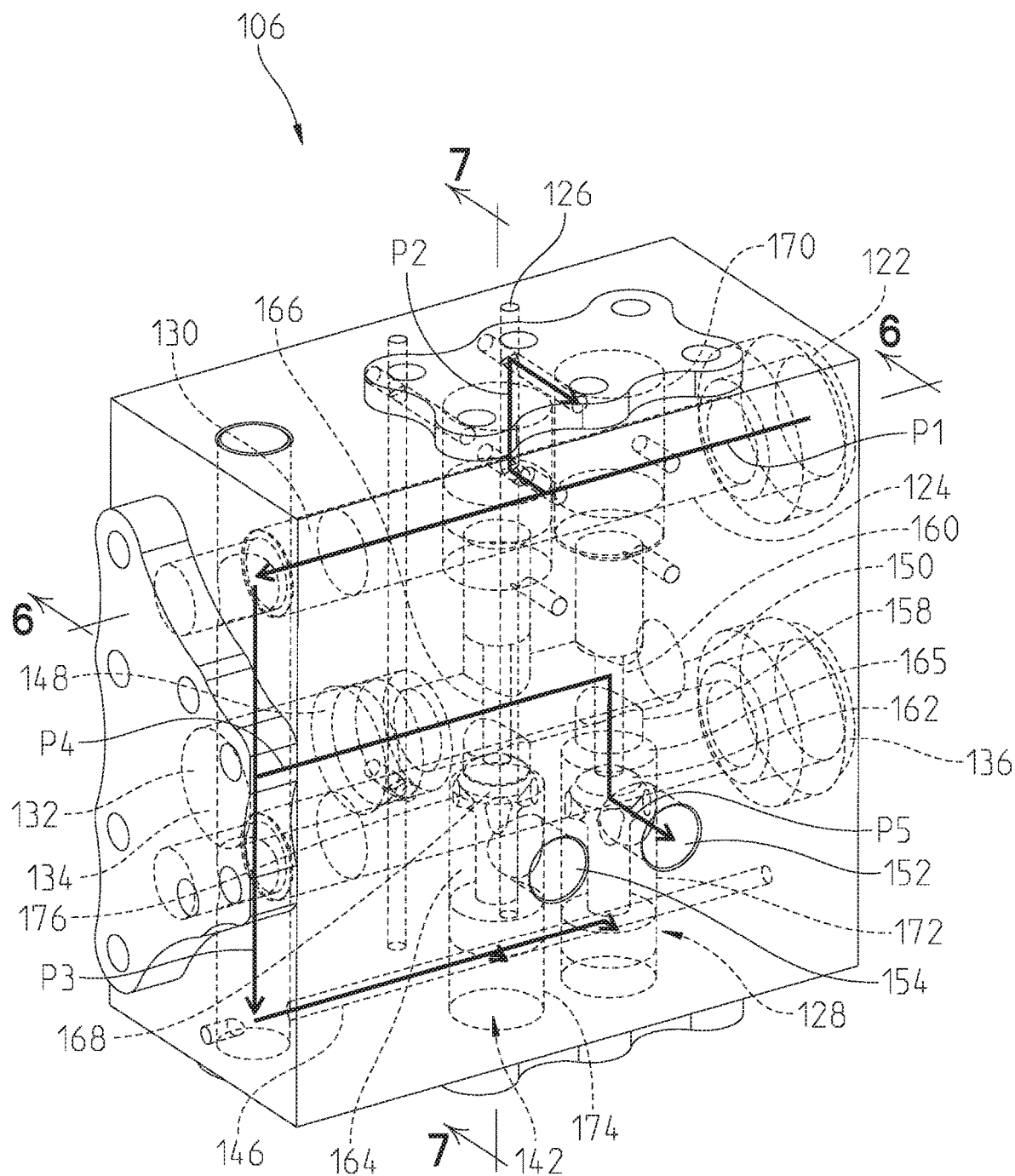
FIG. 5 is a perspective view of the manifold of FIG. 3, and internal components are illustrated with phantom lines to illustrate water flowing from a first inlet, through the manifold, and to a first manifold outlet.
Figure 6:
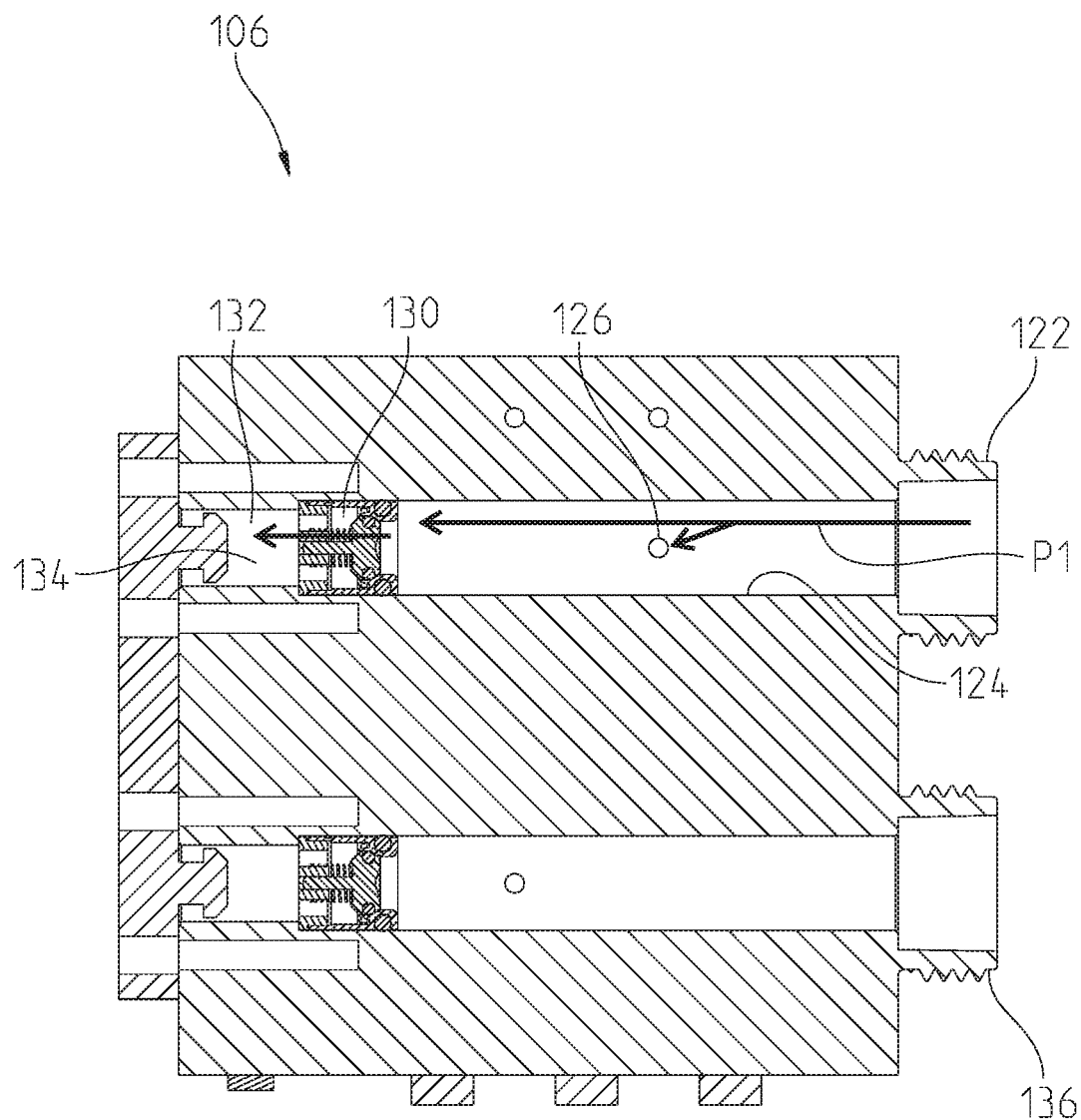
FIG. 6 is a sectional view of the manifold along line 6-6 of FIG. 5 illustrating water flowing through a first inlet passageway and into a first pilot passageway.
Figure 7:
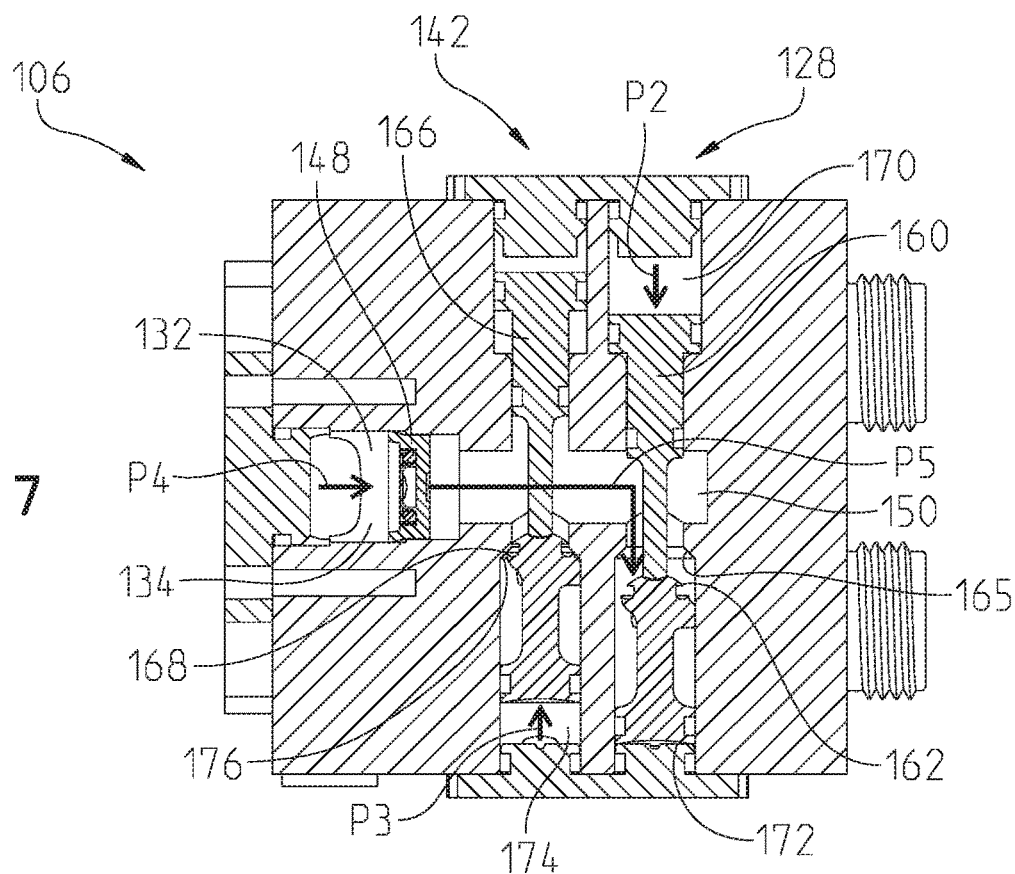
FIG. 7 is a sectional view of the of the manifold along line 7-7 of FIG. 5 illustrating water flowing through a common passageway.
Figure 8:
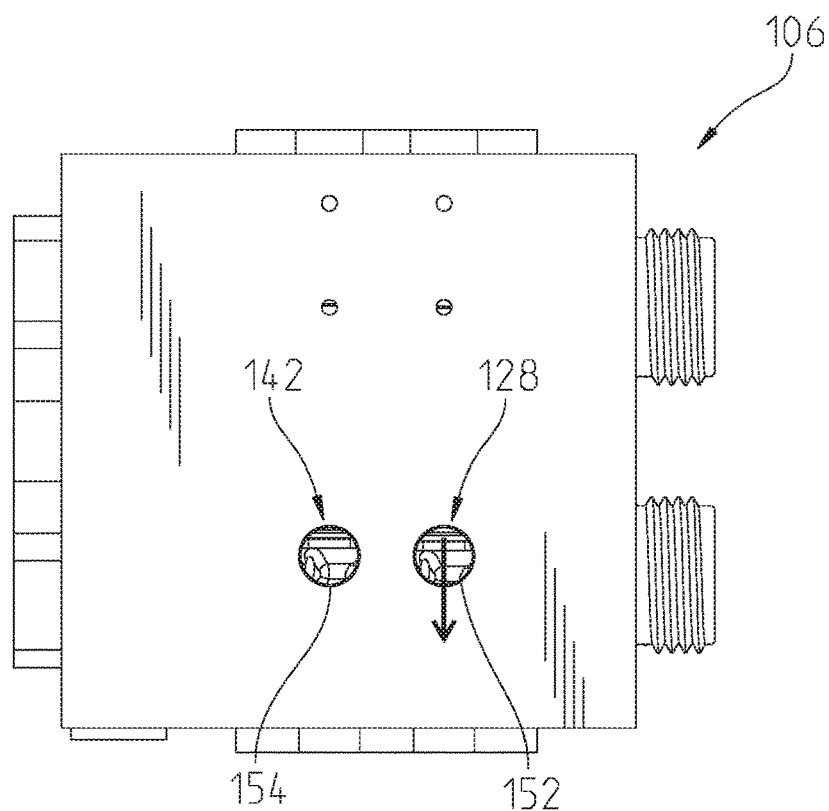
FIG. 8 is a rear view of the manifold of FIG. 3 illustrating water flowing out of the first manifold outlet.

Referring now to FIGS. 5-8, a scenario in which the first inlet 122 receives water and the second inlet 136 does not receive water, or a first operating mode, is illustrated. As shown in FIG. 5, the first inlet 122 receives water, which then travels along path P1 in the first inlet passageway 124. As shown in FIGS. 5 and 6, the first pilot passageway 126 receives water from the first inlet passageway 124, which, as shown in FIGS. 5 and 7, travels along path P2 and is received in a first portion 170 of the first valve chamber 158 and thereby translates to the first valve piston 160 to a first open position in the first valve chamber 158. That is, the first valve piston 160 occupies a position in which the first seat 162 disengages a first seating surface 165 to permit water to flow to the first manifold outlet 152. The water traveling along path P1 in the first inlet passageway 124 passes through the first check valve 130 and is received in the upstream portion 132 of the common passageway 134. Some of the water in the common passageway 134 travels along path P3 and is received in the common pilot passageway 146. The water traveling along path P3 is then received in a second portion 172 of the first valve chamber 158 and a second portion 174 of the second valve chamber 164. The water in the second portion 172 of the first valve chamber 158 applies a force to the first valve piston 160 that is less than a force applied to the first valve piston 160 in the opposite direction (that is, by the water in the first portion 170 of the first valve chamber 158). As such, the first valve piston 160 remains in the open position. By contrast, the water in the second portion 174 of the second valve chamber 164 applies a force to the second valve piston 166 that is greater than a force applied to the second valve piston 166 in the opposite direction, which may be negligible. As such, the second valve piston 166 occupies a second closed position. That is, the second valve piston 166 occupies a position in which the second seat 168 engages a second seating surface 176 to inhibit water from flowing to the second manifold outlet 154. With continued reference to FIGS. 5 and 7, some of the water in the upstream portion 132 of the common passageway 134 travels along path P4, passes through the flow restricting device 148, and is received in the downstream portion 150 of the common passageway 134. The water in the downstream portion 150 of the common passageway 134 travels along path P5. As shown in FIGS. 5, 7, and 8, the first valve 128, which is in the open position, permits water to flow therethrough and exit the manifold 106 via the first manifold outlet 152. The second valve 142, which is in the closed position, inhibits water from flowing therethrough and exiting the manifold 106 via the second manifold outlet 154.

Figure 9:
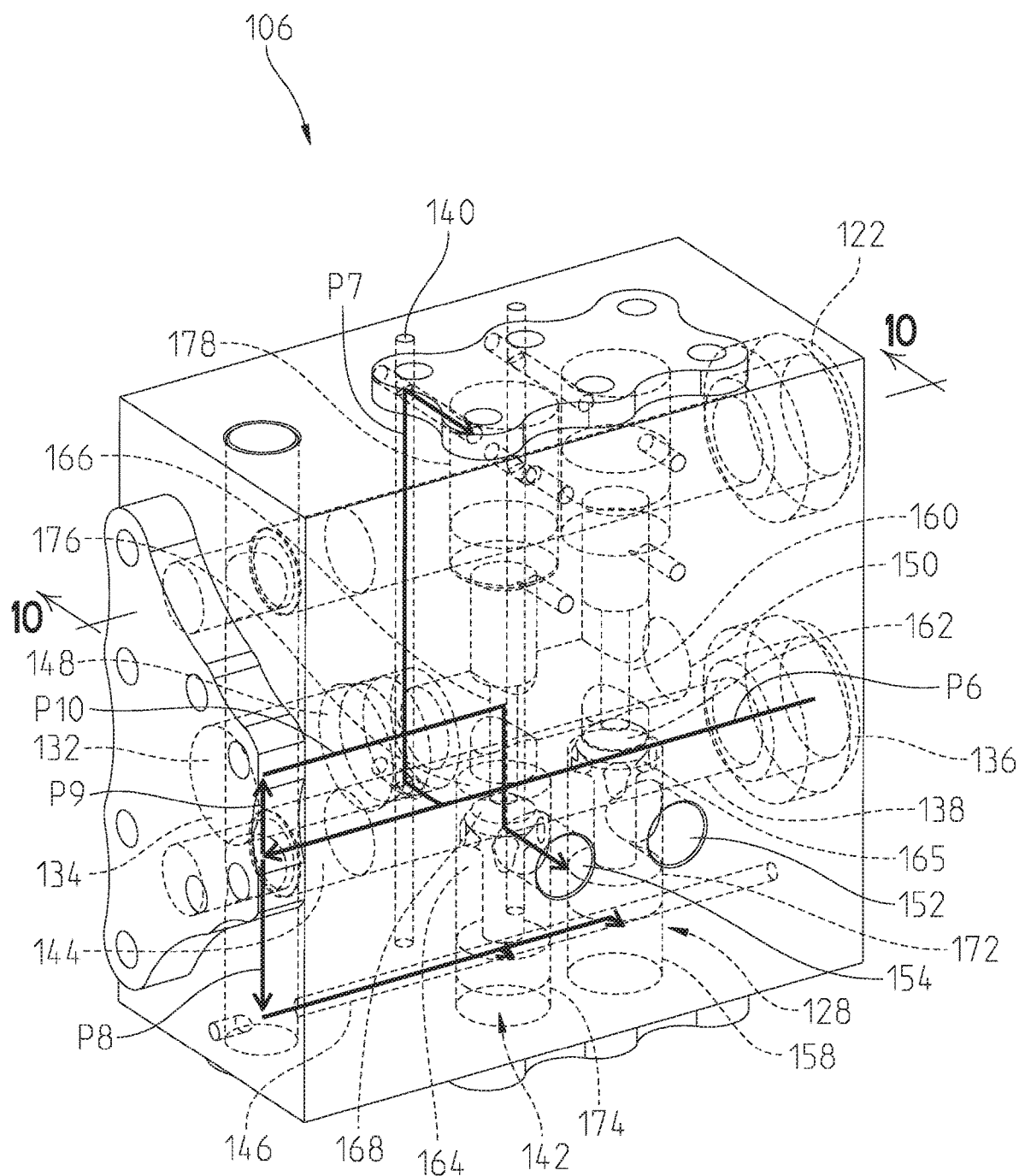
FIG. 9 is a perspective view of the manifold of FIG. 3, and internal components are illustrated with phantom lines to illustrate water flowing from a second inlet, through the manifold, and to a second manifold outlet.
Figure 10:
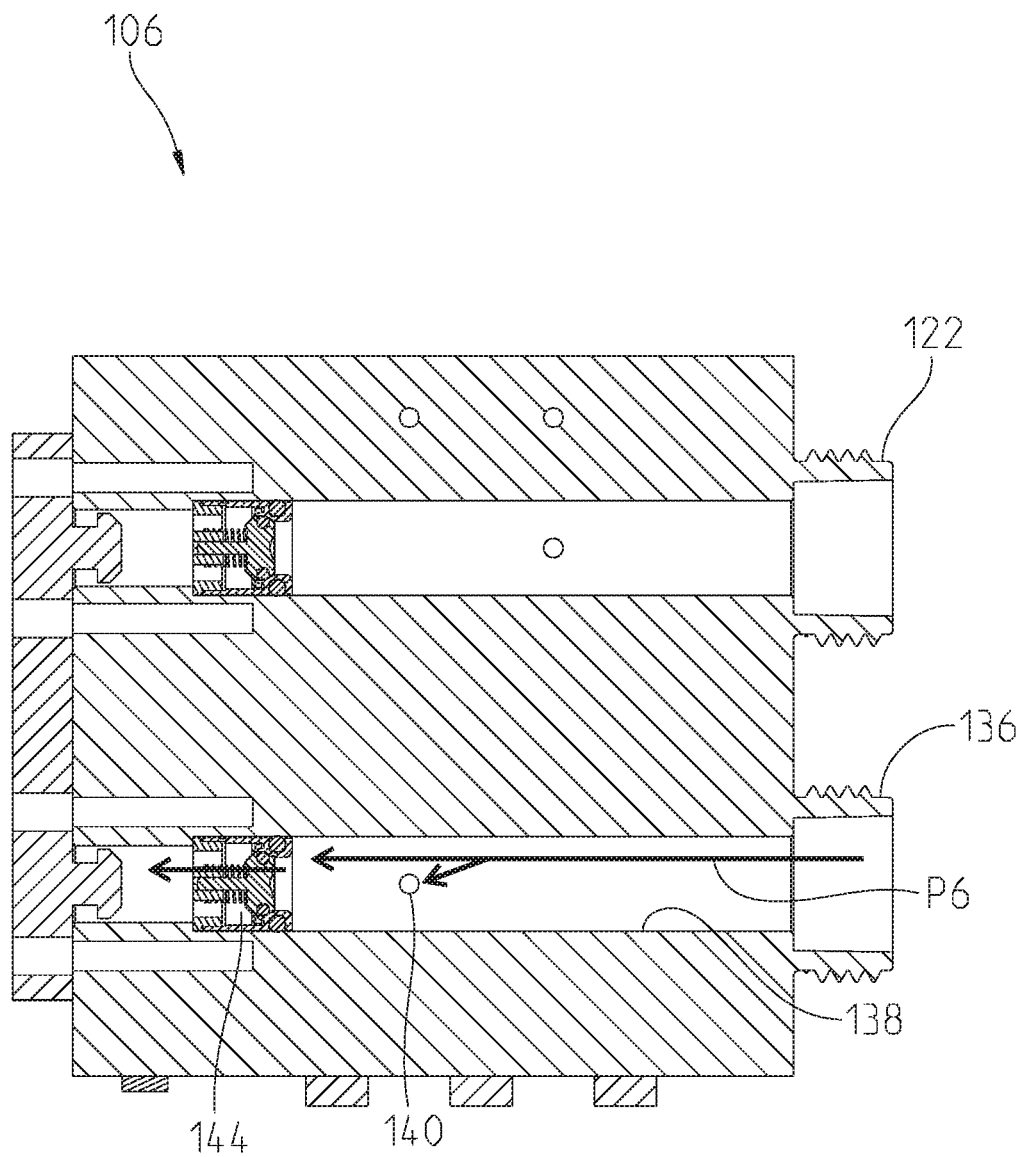
FIG. 10 is a sectional view of the manifold along line 10-10 of FIG. 9 illustrating water flowing through a second inlet passageway and into a second pilot passageway.

Referring now to FIGS. 9 and 10, a scenario in which the first inlet 122 does not receive water and the second inlet 136 receives water, or a second operating mode, is illustrated. As shown in FIG. 9, the second inlet 136 receives water, which then travels along path P6 in the second inlet passageway 138. As shown in FIGS. 9 and 10, the second pilot passageway 140 receives water from the second inlet passageway 138, which, as shown in FIG. 9, travels along path P7 and is received in a first portion 178 of the second valve chamber 164 and thereby translates to the second valve piston 166 to a second open position in the second valve chamber 164. That is, the second valve piston 166 occupies a position in which the second seat 168 disengages a second seating surface 176 to permit water to flow to the second manifold outlet 154. The water traveling along path P6 in the second inlet passageway 138 passes through the second check valve 144 and is received in the upstream portion 132 of the common passageway 134. Some of the water in the common passageway 134 travels along path P8 and is received in the common pilot passageway 146. The water traveling along path P8 is then received in the second portion 172 of the first valve chamber 158 and the second portion 174 of the second valve chamber 164. The water in the second portion 174 of the second valve chamber 164 applies a force to the second valve piston 166 that is less than a force applied to the second valve piston 166 in the opposite direction (that is, by the water in the first portion 178 of the second valve chamber 164). As such, the second valve piston 166 remains in the open position. By contrast, the water in the second portion 172 of the first valve chamber 158 applies a force to the first valve piston 160 that is greater than a force applied to the first valve piston 160 in the opposite direction, which may be negligible. As such, the first valve piston 160 occupies a first closed position. That is, the first valve piston 160 occupies a position in which the first seat 162 engages the first seating surface 165 to inhibit water from flowing to the first manifold outlet 152. With continued reference to FIG. 9, some of the water in the upstream portion 132 of the common passageway 134 travels along path P9, passes through the flow restricting device 148, and is received in the downstream portion 150 of the common passageway 134. The water in the downstream portion 150 of the common passageway 134 travels along path P10. The second valve 142, which is in the open position, permits water to flow therethrough and exit the manifold 106 via the second manifold outlet 154. The first valve 128, which is in the closed position, inhibits water from flowing therethrough and exiting the manifold 106 via the first manifold outlet 152.

Figure 11:
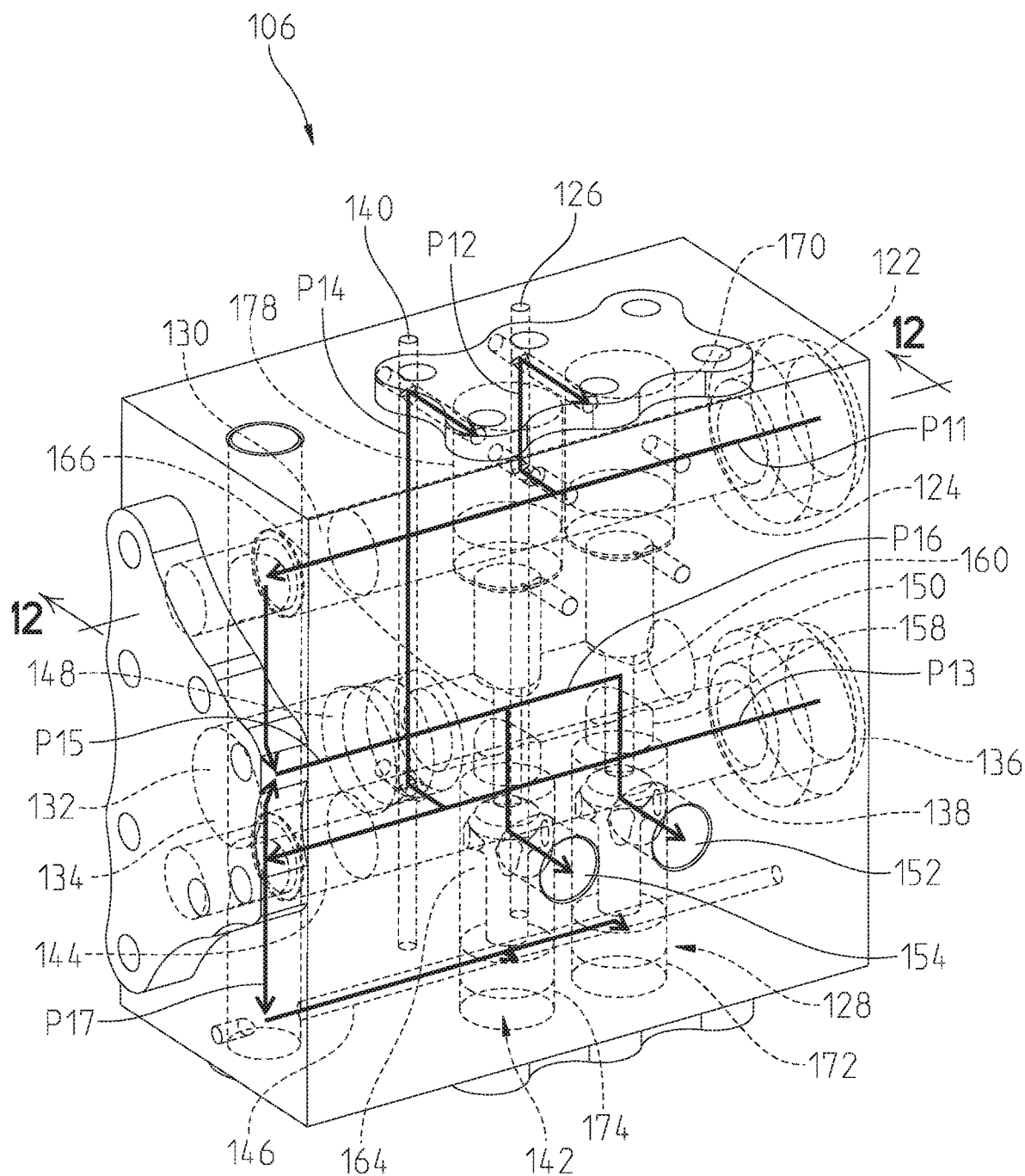
FIG. 11 is a perspective view of the manifold of FIG. 3, and internal components are illustrated with phantom lines to illustrate water flowing from both the first inlet and the second inlet, through the manifold, and to both the first manifold outlet and the second manifold outlet.
Figure 12:
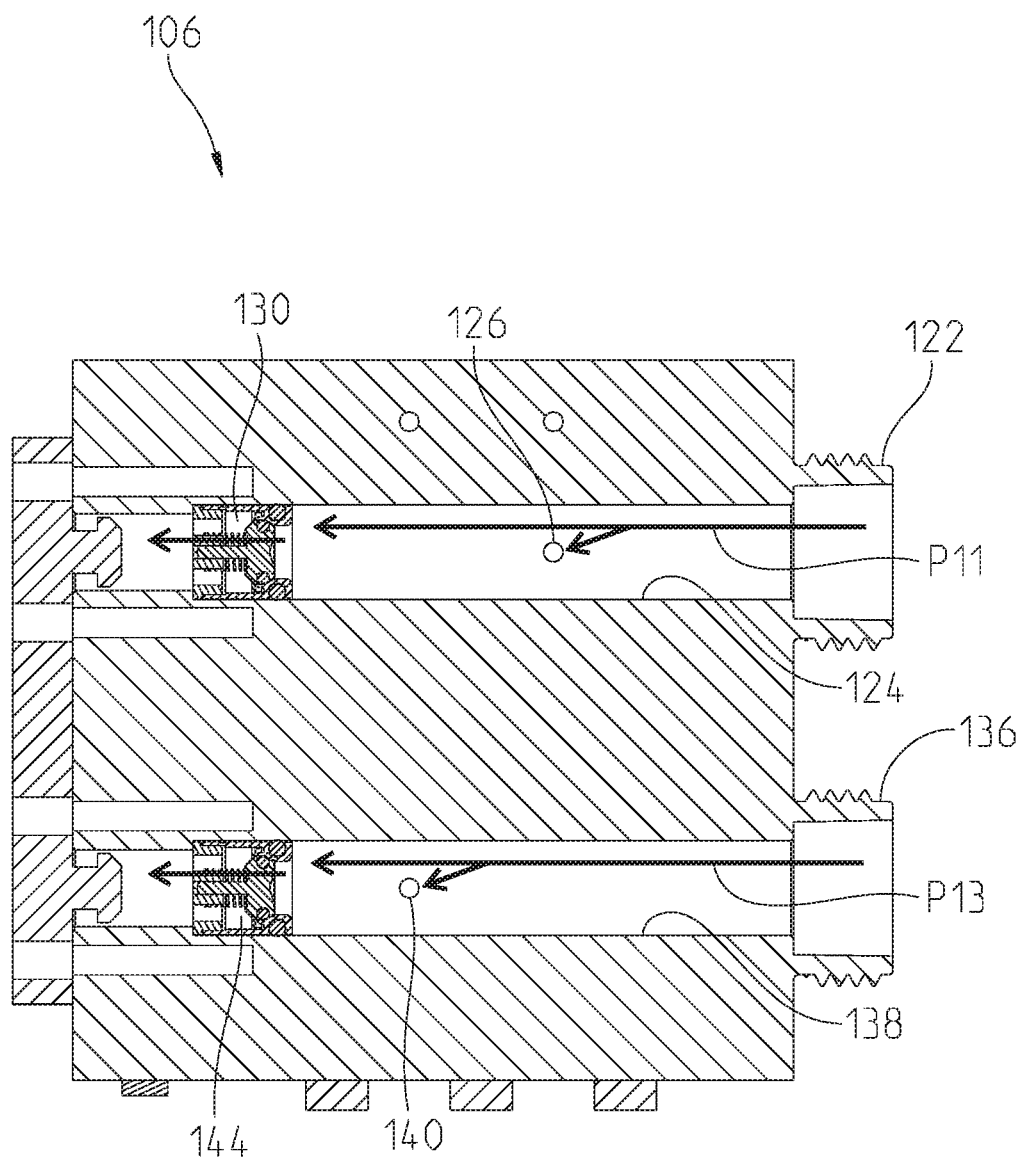
FIG. 12 is a sectional view of the manifold along line 12-12 of FIG. 11 illustrating water flowing through the first inlet passageway and into the first pilot passageway and through the second inlet passageway and into the second pilot passageway.

Referring now to FIGS. 11 and 12, a scenario in which both the first inlet 122 and the second inlet 136 receive water, or a combination of the first and second operating modes, is illustrated. As shown in FIG. 11, the first inlet 122 receives water, which then travels along path P11 in the first inlet passageway 124. The first pilot passageway 126 receives water from the first inlet passageway 124, which, as shown in FIG. 11, travels along path P12 and is received in the first portion 170 of the first valve chamber 158 and thereby translates to the first valve piston 160 to the first open position in the first valve chamber 158. The water traveling along path P11 in the first inlet passageway 124 passes through the first check valve 130 and is received in the upstream portion 132 of the common passageway 134. The second inlet 136 also receives water, which then travels along path P13 in the second inlet passageway 138. The second pilot passageway 140 receives water from the second inlet passageway 138, which, as shown in FIG. 11, travels along path P14 and is received in the first portion 178 of the second valve chamber 164 and thereby translates to the second valve piston 166 to the second open position in the second valve chamber 164. The water traveling along path P13 in the second inlet passageway 138 passes through the second check valve 144 and is received in the upstream portion 132 of the common passageway 134. Some of the water in the common passageway 134 travels along path P17 and is received in the common pilot passageway 146. The water traveling along path P17 is then received in the second portion 172 of the first valve chamber 158 and the second portion 174 of the second valve chamber 164. The water in the second portion 172 of the first valve chamber 158 applies a force to the first valve piston 160 that is less than a force applied to the first valve piston 160 in the opposite direction (that is, by the water in the first portion 170 of the first valve chamber 158). As such, the first valve piston 160 remains in the open position. Similarly, the water in the second portion 174 of the second valve chamber 164 applies a force to the second valve piston 166 that is less than a force applied to the second valve piston 166 in the opposite direction (that is, by the water in the first portion 178 of the second valve chamber 164). As such, the second valve piston 166 remains in the open position. With continued reference to FIG. 11, some of the water in the upstream portion 132 of the common passageway 134 travels along path P15, passes through the flow restricting device 148, and is received in the downstream portion 150 of the common passageway 134. The water in the downstream portion 150 of the common passageway 134 travels along path P16. The first valve 128, which is in the open position, permits water to flow therethrough and exit the manifold 106 via the first manifold outlet 152. Similarly, the second valve 142, which is in the open position, permits water to flow therethrough and exit the manifold 106 via the second manifold outlet 154.

In some embodiments, showerhead systems according to the present disclosure may take other forms. For example, the first spout outlets 108 and the second spout outlets 110 are illustrated in a side-to-side arrangement. In alternative embodiments, the first spout outlets 108 and the second spout outlets 110 may have other arrangements. More specifically, the first spout outlets 108 may partially or fully surround the second spout outlets 110. As another exemplary alternative embodiment, flow restricting and diverting manifolds according to the present disclosure may include different types of valves or valve arrangements. As a specific example, the first valve 128 and/or the second valve 142 may be a diaphragm valve, a spool valve, or a shuttle valve.

Figure 13:
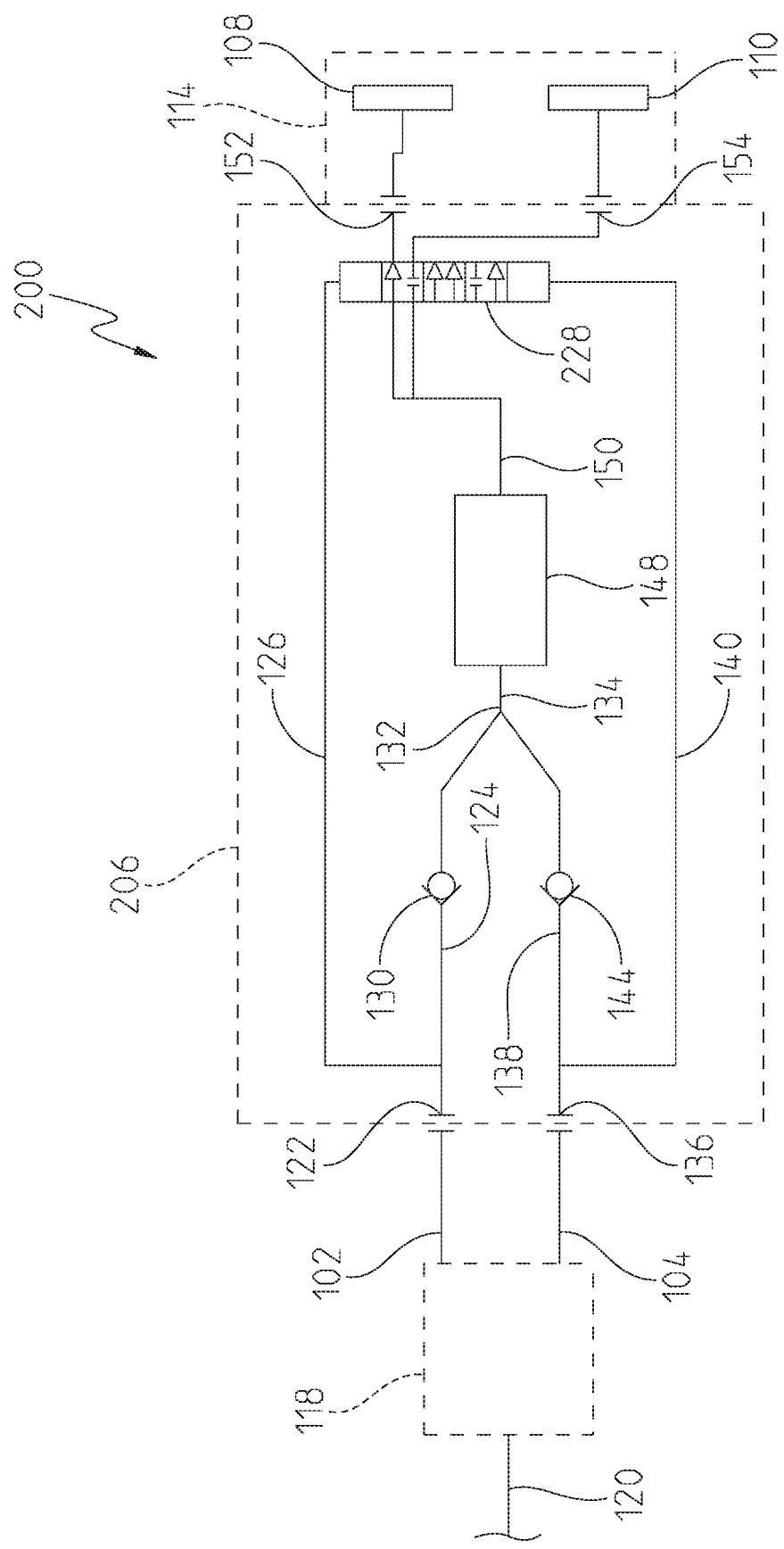
FIG. 13 is a schematic illustration of another illustrative showerhead system of the present disclosure.

As another example, FIG. 13 illustrates a showerhead system 200 including another illustrative manifold 206. The showerhead system 200 also includes one or more primary water supply conduits 120, a flow controller 118, a first water supply conduit 102, a second water supply conduit 104, and a showerhead spout 114 including one or more first spout outlets 108 and one or more second spout outlets 110, all of which are as described above. The manifold 206 illustratively includes a single valve 228 for selectively delivering water to the first spout outlets 108 and/or the second spout outlets 110. The manifold 206 illustratively includes a first inlet 122 in fluid communication with the first water supply conduit 102. The first inlet 122 is in fluid communication with a first inlet passageway 124. The first inlet passageway 124 is in fluid communication with a first pilot passageway 126, which is in operable communication with the valve 228 (illustratively, a three-position two-way valve) as described in further detail below. The first inlet passageway 124 is also in fluid communication with a first check valve 130. The first check valve 130 is in fluid communication with an upstream portion 132 of a common passageway 134. The flow restricting and diverting manifold 206 illustratively includes similar components for coupling to the second water supply conduit 104. That is, the manifold 206 illustratively includes a second inlet 136 in fluid communication with the second water supply conduit 104. The second inlet 136 is in fluid communication with a second inlet passageway 138. The second inlet passageway 138 is in fluid communication with a second pilot passageway 140, which is in operable communication with the valve 228 as described in further detail below. The second inlet passageway 138 is also in fluid communication with a second check valve 144. The second check valve 144 is in fluid communication with the upstream portion 132 of the common passageway 134. The upstream portion 132 of the common passageway 134 is also in fluid communication with a flow restricting device 148. The flow restricting device 148 restricts the flow rate of water through the common passageway 134 and, as a result, the manifold 206 overall. The flow restricting device 148 is in fluid communication with a downstream portion 150 of the common passageway 134. The downstream portion 150 of the common passageway 134 is in fluid communication with the valve 228. The valve 228 is in fluid communication with a first manifold outlet 152, and the first manifold outlet 152 is in fluid communication with the first spout outlets 108. The valve 228 is also in fluid communication with a second manifold outlet 154, and the second manifold outlet 154 is in fluid communication with the second spout outlets 110.

The manifold 206 selectively delivers water to the first spout outlets 108 and the second spout outlets 110 in a manner similar to the manifold 206, except as follows. In a scenario in which the first water supply conduit 102 delivers water to the first inlet 122 and the second water supply conduit 104 does not deliver water to the second inlet 136, or a first operating mode, the first inlet passageway 124 delivers water to the first pilot passageway 126, which actuates the valve 228 to a first position (as shown in FIG. 13). In the first position, (1) the valve 228 permits water to flow to the first manifold outlet 152 and, accordingly, the first spout outlets 108, and (2) the valve 228 inhibits water from flowing to the second manifold outlet 154 and, accordingly, the second spout outlets 110. In a scenario in which the first water supply conduit 102 delivers water to the first inlet 122 and the second water supply conduit 104 delivers water to the second inlet 136, or a combination of the first operating mode and a second operating mode, the first inlet passageway 124 delivers water to the first pilot passageway 126 and the second inlet passageway 138 delivers water to the second pilot passageway 140. This actuates the valve 228 to a second position (below the first position shown in FIG. 13). In the second position, (1) the valve 228 permits water to flow to the first manifold outlet 152 and, accordingly, the first spout outlets 108, and (2) the valve 228 permits water to flow to the second manifold outlet 154 and, accordingly, the second spout outlets 110. In a scenario in which the first water supply conduit 102 does not deliver water to the first inlet 122 and the second water supply conduit 104 delivers water to the second inlet 136, or the second operating mode, the second inlet passageway 138 delivers water to the second pilot passageway 140, which actuates the valve 228 to a third position (below the second position shown in FIG. 13). In the third position, (1) the valve 228 permits water to flow to the second manifold outlet 154 and, accordingly, the second spout outlets 110, and (2) the valve 228 inhibits water from flowing to the first manifold outlet 152 and, accordingly, the first spout outlets 108.

As another exemplary alternative embodiment, illustrative manifolds according to the present disclosure may include additional inlets, valves, and outlets. More specifically, each additional inlet may receive water from a corresponding supply conduit, and each additional inlet may include a corresponding valve and outlet. As yet another example, the common pilot passageway 146 may be in fluid communication with the downstream portion 150 of the common passageway 134 and the first valve 128 and the second valve 142. As another example, illustrative manifolds may include one or more components that bias the valve(s) toward the closed position, such as springs, opposing magnets, and the like, and the common pilot passageway may be omitted.

Figure 14:
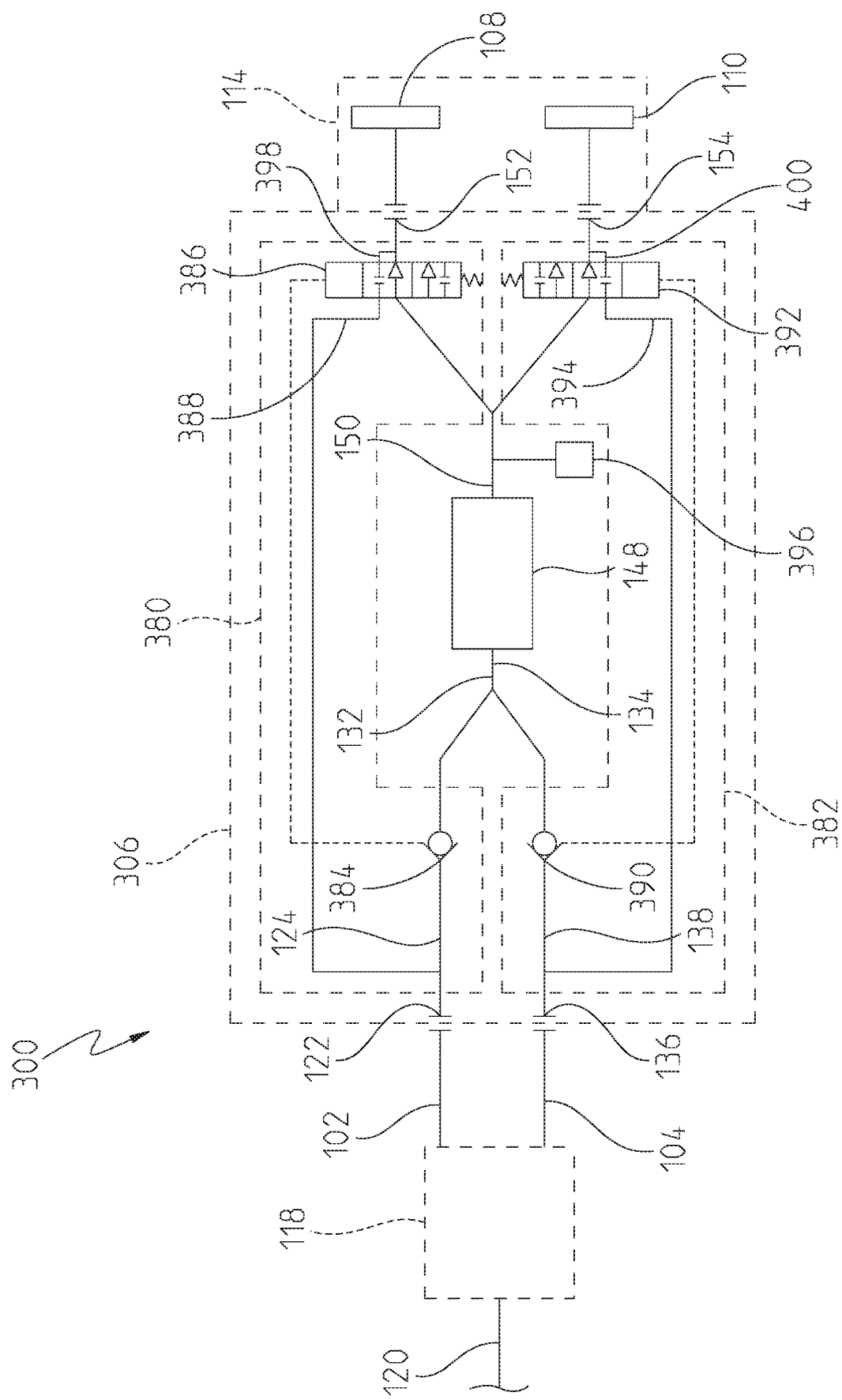
FIG. 14 is a schematic illustration of yet another illustrative showerhead system of the present disclosure.

As another example, FIG. 14 illustrates a showerhead system 300 including another illustrative manifold 306. The showerhead system 300 also includes one or more primary water supply conduits 120, a flow controller 118, a first water supply conduit 102, a second water supply conduit 104, and a showerhead spout 114 including one or more first spout outlets 108 and one or more second spout outlets 110, all of which are as described above. The manifold 306 illustratively includes a first valve 380 and a second valve 382 for selectively delivering water to the first spout outlets 108 and the second spout outlets 110, respectively. As described in further detail below, the first valve 380 and the second valve 382 act as diverter valves (more specifically, two-position one-way valves) in some operating modes and check valves in some operating modes.

With continued reference to FIG. 14, illustrative components of the manifold 306 will now be described, and operation of the manifold 306 will be described later with reference to other figures. The the manifold 306 illustratively includes a first inlet 122 in fluid communication with the first water supply conduit 102. The first inlet 122 is in fluid communication with a first inlet passageway 124. The first inlet passageway 124 is in operable communication with the first valve 380. More specifically, the first inlet passageway 124 is in fluid communication with a first valve element 384 of the first valve 380. The first valve element 384 is symbolically illustrated as a check valve, although the first valve element 384 only acts as a check valve in some operating modes. In other operating modes, the first valve element 384 acts, together with other components of the first valve 380, as a diverter valve. The first valve element 384 operably couples to a second valve element 386 of the first valve 380 (illustrated as a two-position one-way valve) as described in further detail below. The first valve element 384 is in fluid communication with an upstream portion 132 of a common passageway 134. The first inlet passageway 124 is also in fluid communication with a first relief inlet passageway 388, which is also in fluid communication with the second valve element 386. The first relief inlet passageway 388, as described in further detail below, facilitates providing a pressure relief path from the first inlet 122 to a first manifold outlet 152 via the first valve 380 when the first valve 380 is in a closed position.

With continued reference to FIG. 14, the flow restricting and diverting manifold 306 illustratively includes similar components for coupling to the second water supply conduit 104. That is, the manifold 306 illustratively includes a second inlet 136 in fluid communication with the second water supply conduit 104. The second inlet 136 is in fluid communication with a second inlet passageway 138. The second inlet passageway 138 is in operable communication with the second valve 382. More specifically, the second inlet passageway 138 is in fluid communication with a first valve element 390 of the second valve 382. The first valve element 390 is symbolically illustrated as a check valve, although the first valve element 390 only acts as a check valve in some operating modes. In other operating modes, the first valve element 390 acts, together with other components of the second valve 382, as a diverter valve. The first valve element 390 operably couples to a second valve element 392 of the second valve 382 (illustrated as a two-position one-way valve) as described in further detail below. The first valve element 390 is in fluid communication with the upstream portion 132 of the common passageway 134. The second inlet passageway 138 is also in fluid communication with a second relief inlet passageway 394, which is also in fluid communication with the second valve element 392. The second relief inlet passageway 394, as described in further detail below, facilitates providing a pressure relief path from the second inlet 136 to a second manifold outlet 154 via the second valve 382 when the second valve 382 is in a closed position.

With further reference to FIG. 14, the upstream portion 132 of the common passageway 134 is also in fluid communication with a flow restricting device 148. The flow restricting device 148 restricts the flow rate of water through the common passageway 134 and, as a result, the manifold 306 overall. The flow restricting device 148 is in fluid communication with a downstream portion 150 of the common passageway 134. The downstream portion 150 of the common passageway 134 is in fluid communication with a pressure reliever 396 that inhibits hydraulically locking the first valve 380 and the second valve 382, as described in further detail below. The downstream portion 150 of the common passageway 134 is also in fluid communication with both the first valve 380 and the second valve 382. The first valve 380 is in fluid communication with the first manifold outlet 152, and the first manifold outlet 152 is in fluid communication with the first spout outlets 108. The first manifold outlet 152 is also in fluid communication with a first relief outlet passageway 398 which, as described in further detail below, facilitates providing the pressure relief path from the first inlet 122 to the first manifold outlet 152 via the first valve 380 when the first valve 380 is in the closed position. The second valve 382 is in fluid communication with the second manifold outlet 154, and the second manifold outlet 154 is in fluid communication with the second spout outlets 110. The second manifold outlet 154 is also in fluid communication with a second relief outlet passageway 400 which, as described in further detail below, facilitates providing the pressure relief path from the second inlet 136 to the second manifold outlet 154 via the second valve 382 when the second valve 382 is in the closed position.

Figure 15:
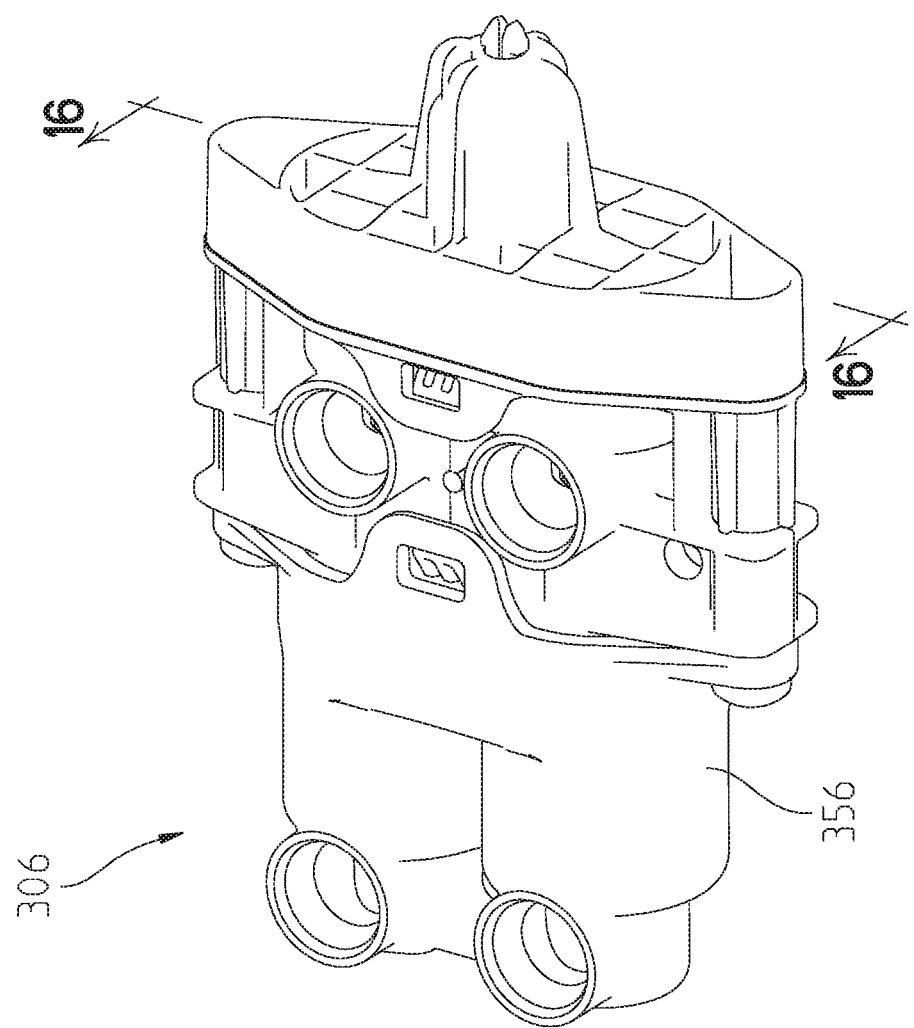
FIG. 15 is a perspective view of an illustrative flow restricting and diverting manifold of the showerhead system of FIG. 14.

Referring now to FIG. 15, the flow restricting and diverting manifold 306 of the showerhead system 300 is illustrated. The manifold 306 includes a body 356 that defines some of the components described above and internally carries others of the components described above. More specifically and referring now to the sectional view of FIG. 16, the manifold 306 includes the first inlet 122, the first inlet passageway 124, the first valve 380, the first relief inlet passageway 388, the second inlet 136, the second inlet passageway 138, the second valve 382, the second relief inlet passageway 394, the upstream portion 132 of the common passageway 134, the flow restricting device 148, the downstream portion 150 of the common passageway 134, the first manifold outlet 152, the second manifold outlet 154, the pressure reliever 396, the first relief outlet passageway 398, and the second relief outlet passageway 400. The first valve element 384 of the first valve 380 illustratively includes a first valve element chamber 402 that translatably carries a piston 404. The second valve element 386 of the first valve 380 illustratively includes a second valve element chamber 406 that translatably carries a poppet 408. As described in further detail below, the piston 404 and the poppet 408 are translatable to selectively open and close the first valve 380. Similarly, the first valve element 390 of the second valve 382 illustratively includes a first valve element chamber 410 that translatably carries a piston 412. The second valve element 392 of the second valve 382 illustratively includes a second valve element chamber 414 that translatably carries a poppet 416. As described in further detail below, the piston 412 and the poppet 416 are translatable to selectively open and close the second valve 382.

Figure 16:
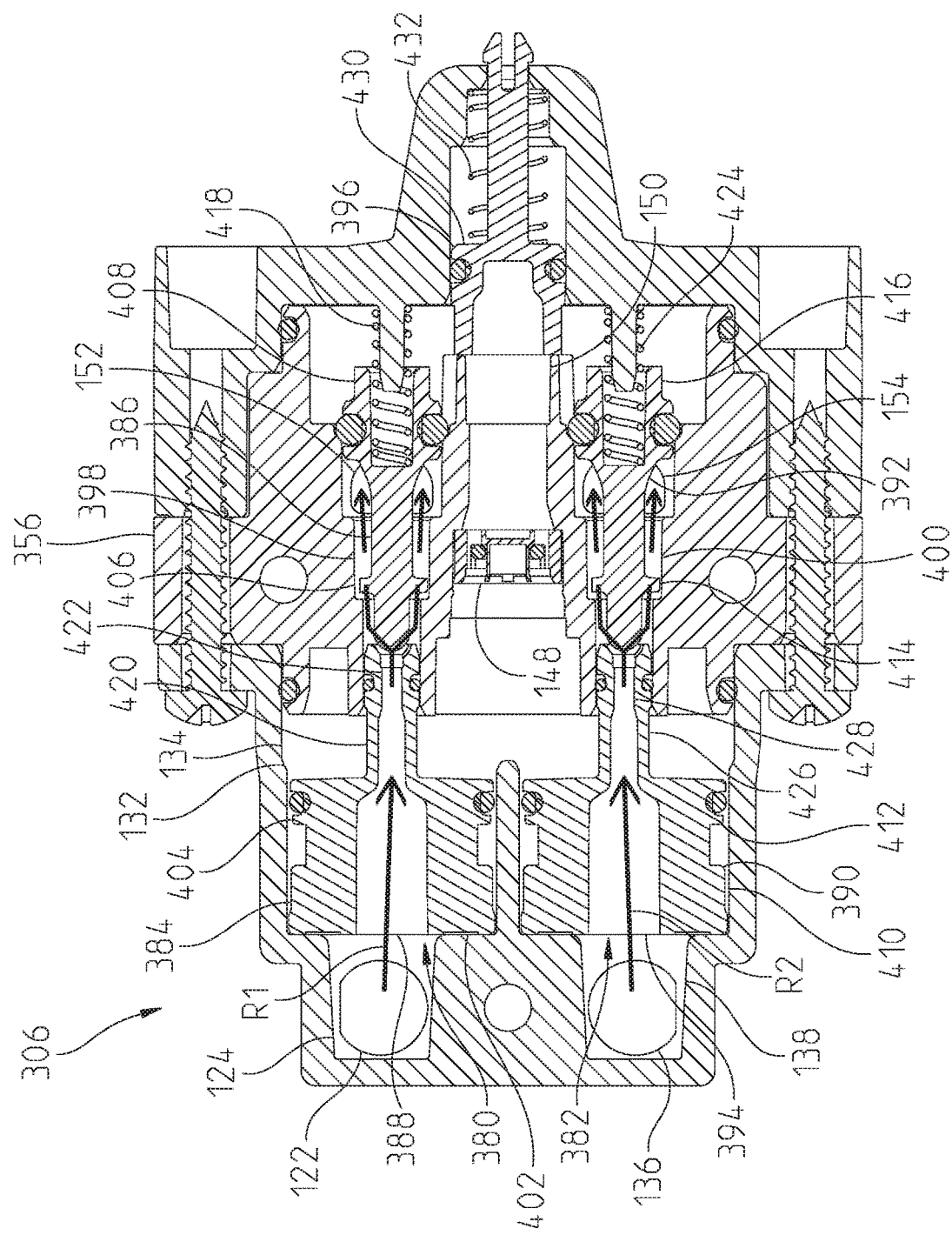
FIG. 16 is a sectional view of the manifold along line 16-16 of FIG. 15 and illustrating closed positions of a first valve and a second valve of the manifold.

With continued reference to FIG. 16, a scenario is illustrated in which neither the first inlet 122 nor the second inlet 136 receive water, or an "off" mode in which the first valve 380 and the second valve 382 are in closed positions. As illustrated, the piston 404 of the first valve 380 sealingly engages the wall of the first valve element chamber 402 and a spring 418 maintains the poppet 408 in sealing engagement with the wall of the second valve element chamber 406. The first valve 380 thereby inhibits flow therethrough in the closed position. However, the first valve 380 provides a first pressure relief path R1 from the first inlet 122 to the first manifold outlet 152 in the closed position. More specifically, a stem 420 of the piston 404 disengages the poppet 408, and the first pressure relief path R1 is provided by an inner passageway 422 extending through the piston 404 and the second valve element chamber 406. Similarly, the piston 412 of the second valve 382 sealingly engages the wall of the first valve element chamber 410 and a spring 424 maintains the poppet 416 in sealing engagement with the wall of the second valve element chamber 414. The second valve 382 thereby inhibits flow therethrough in the closed position. However, the second valve 382 provides a second pressure relief path R2 from the second inlet 136 to the second manifold outlet 154 in the closed position. More specifically, a stem 426 of the piston 412 disengages the poppet 416, and the second pressure relief path R2 is provided by an inner passageway 428 extending through the piston 412 and the second valve element chamber 414.

Figure 17:
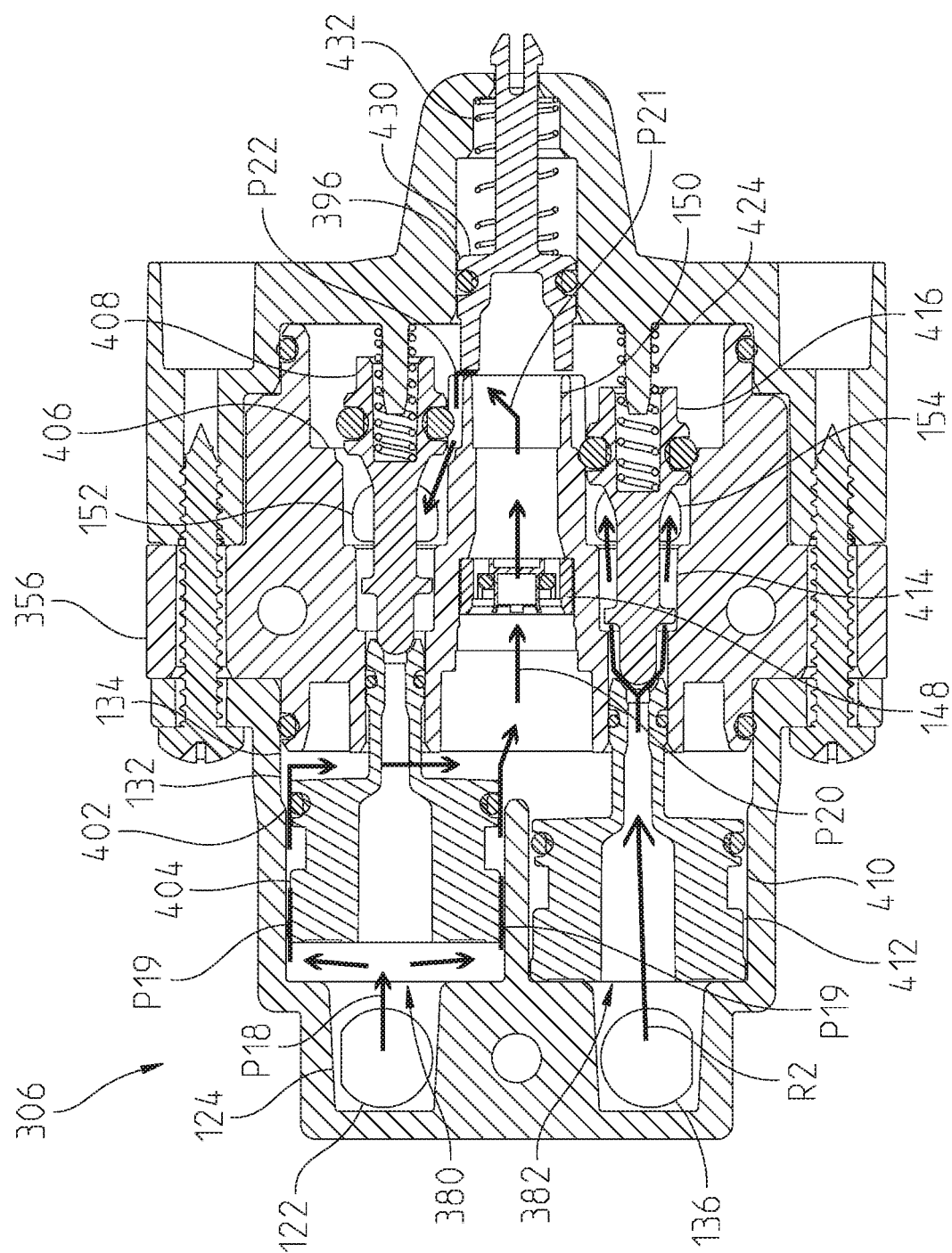
FIG. 17 is another sectional view of the manifold along line 16-16 of FIG. 15 and illustrating an open position of the first valve and the closed position of the second valve.

With reference to FIG. 17, a scenario is illustrated in which the first inlet 122 receives water and the second inlet 136 does not receive water, or a first operating mode in which the first valve 380 is in an open position and the second valve 382 is in the closed position. As illustrated for the first valve 380, water received by the first inlet 122 translates and maintains the first valve 380 in the open position, and the first valve 380 thereby permits flow from the first inlet 122 to the first manifold outlet 152. More specifically, the first inlet 122 receives water, which then travels along path P18 in the first inlet passageway 124. The water thereby translates and causes the piston 404 to disengage the wall of the first valve element chamber 402, and the piston 404 translates and causes the poppet 408 to disengage the wall of the second valve element chamber 406. Water travels around the piston 404 along paths P19 and into the upstream portion 132 of the common passageway 134. Water then travels through the flow restricting device 148 along path P20 and into the downstream portion 150 of the common passageway 134. Water then travels past the pressure reliever 396 along path P21, past the poppet 408 along path P22, and to the first manifold outlet 152. As illustrated for the second valve 382, water in the upstream portion 132 of the common passageway 134 holds the piston 412 in sealing engagement with the wall of the first valve element chamber 410 and the spring 424 maintains the poppet 416 in sealing engagement with the wall of the second valve element chamber 414. The second valve 382 thereby inhibits flow therethrough, although the second valve 382 provides the second pressure relief path R2 as described above.

Figure 18:
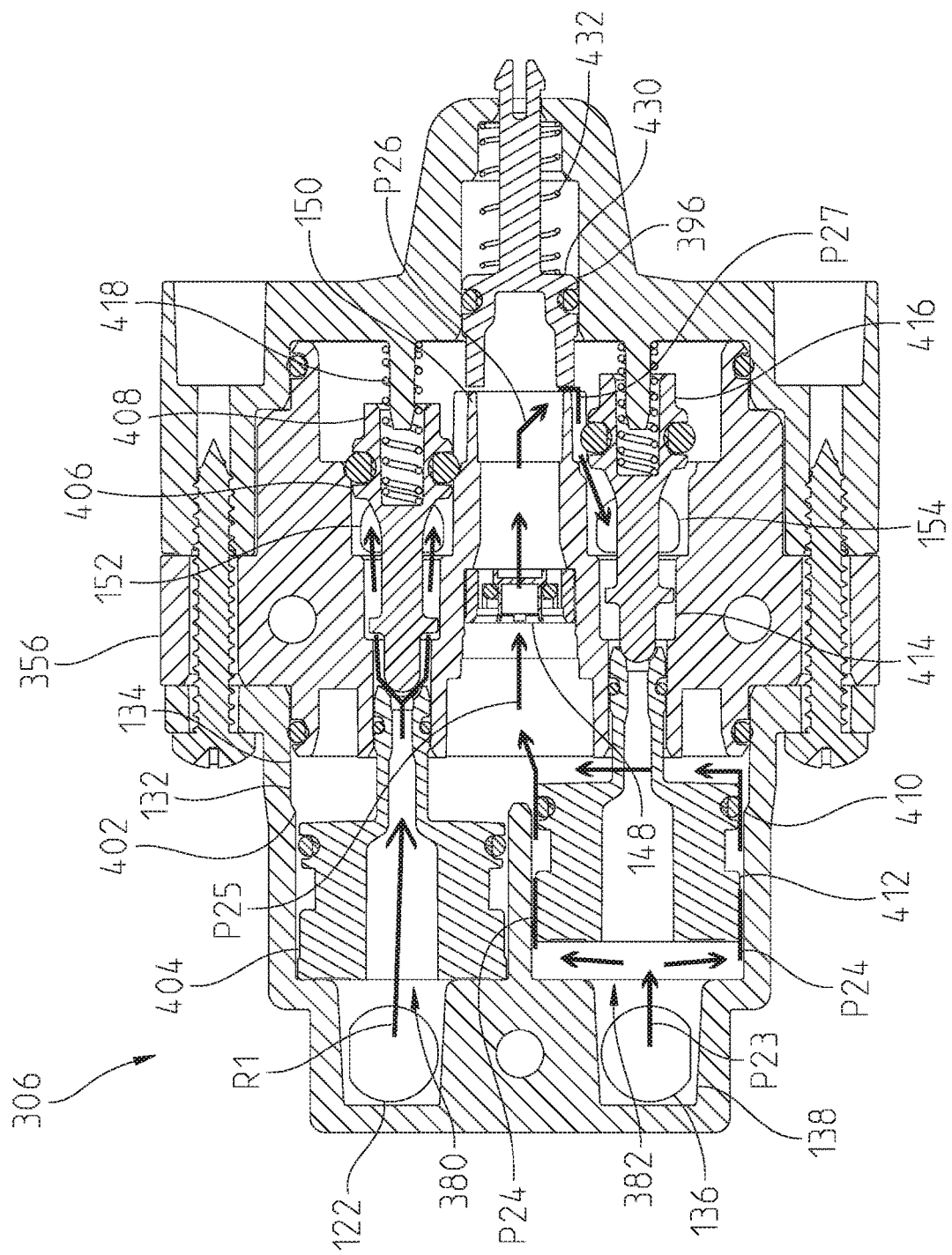
FIG. 18 is another sectional view of the manifold along line 16-16 of FIG. 15 and illustrating the closed position of the first valve and an open position of the second valve.

With reference to FIG. 18, a scenario is illustrated in which the first inlet 122 does not receive water and the second inlet 136 receives water, or a second operating mode in which the first valve 380 is in the closed position and the second valve 382 is in an open position. As illustrated for the first valve 380, water in the upstream portion 132 of the common passageway 134 holds the piston 404 in sealing engagement with the wall of the first valve element chamber 402 and the spring 418 maintains the poppet 408 in sealing engagement with the wall of the second valve element chamber 406. The first valve 380 thereby inhibits flow therethrough, although the first valve 380 provides the first pressure relief path R1 as described above. As illustrated for the second valve 382, water received by the second inlet 136 translates and maintains the second valve 382 in the open position, and the second valve 382 thereby permits flow from the second inlet 136 to the second manifold outlet 154. More specifically, the second inlet 136 receives water, which then travels along path P23 in the second inlet passageway 138. The water thereby translates and causes the piston 412 to disengage the wall of the first valve element chamber 410, and the piston 412 translates and causes the poppet 416 to disengage the wall of the second valve element chamber 414. Water travels around the piston 412 along paths P24 and into the upstream portion 132 of the common passageway 134. Water then travels through the flow restricting device 148 along path P25 and into the downstream portion 150 of the common passageway 134. Water then travels past the pressure reliever 396 along path P26, past the poppet 416 along path P27, and to the second manifold outlet 154.

Figure 19:
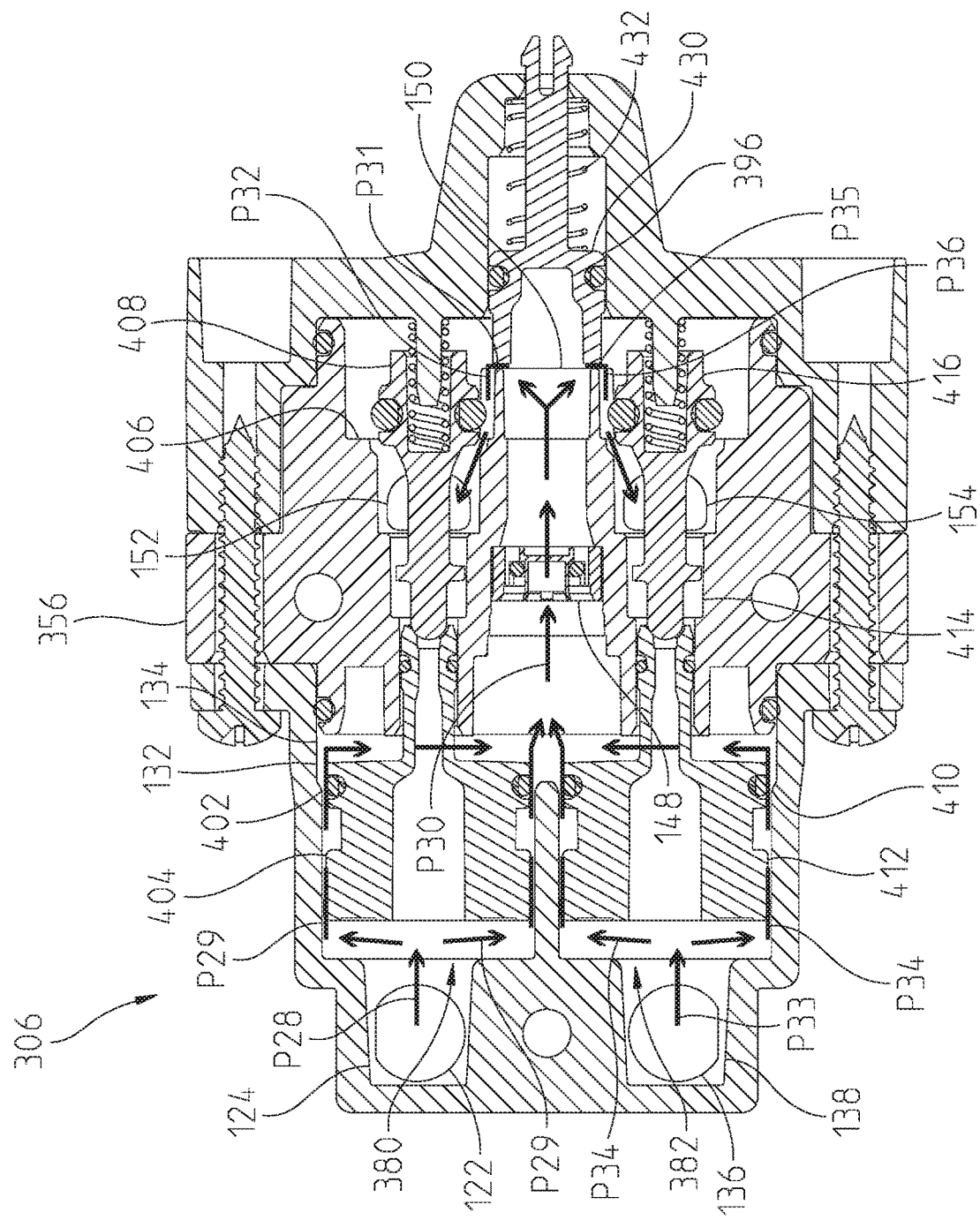
FIG. 19 is yet another sectional view of the manifold along line 16-16 of FIG. 15 and illustrating the open position of the first valve and the open position of the second valve.

With reference to FIG. 19, a scenario is illustrated in which both the first inlet 122 and the second inlet 136 receive water, or a third operating mode in which the first valve 380 and the second valve 382 are both in open positions. As illustrated for the first valve 380, water received by the first inlet 122 translates and maintains the first valve 380 in the open position, and the first valve 380 thereby permits flow from the first inlet 122 to the first manifold outlet 152. More specifically, the first inlet 122 receives water, which then travels along path P28 in the first inlet passageway 124. The water thereby translates and causes the piston 404 to disengage the wall of the first valve element chamber 402, and the piston 404 translates and causes the poppet 408 to disengage the wall of the second valve element chamber 406. Water travels around the piston 404 along paths P29 and into the upstream portion 132 of the common passageway 134. Water then travels through the flow restricting device 148 along path P30 and into the downstream portion 150 of the common passageway 134. Water then travels past the pressure reliever 396 along path P31, past the poppet 408 along path P32, and to the first manifold outlet 152. As illustrated for the second valve 382, water received by the second inlet 136 translates and maintains the second valve 382 in the open position, and the second valve 382 thereby permits flow from the second inlet 136 to the second manifold outlet 154. More specifically, the second inlet 136 receives water, which then travels along path P33 in the second inlet passageway 138. The water thereby translates and causes the piston 412 to disengage the wall of the first valve element chamber 410, and the piston 412 translates and causes the poppet 416 to disengage the wall of the second valve element chamber 414. Water travels around the piston 412 along paths P34 and into the upstream portion 132 of the common passageway 134. Water then travels through the flow restricting device 148 along path P30 and into the downstream portion 150 of the common passageway 134. Water then travels past the pressure reliever 396 along path P35, past the poppet 416 along path P36, and to the second manifold outlet 154.

Referring generally to FIGS. 16-19, the pressure reliever 396 facilitates transitioning from the off mode to each of the first operating mode, the second operating mode, and the third operating mode. More specifically, the pressure reliever 396, which illustratively includes a relief piston 430 and a spring 432 that urges the relief piston 430 toward the common passageway 134, is operable to temporarily increase the internal volume of the body 356 to counter an internal pressure increase and permit the first valve 380 and/or the second valve 382 to the open position. Stated another way, the pressure reliever 396 inhibits hydraulically locking the first valve 380 and the second valve 382 in the closed positions.

Figure 20:
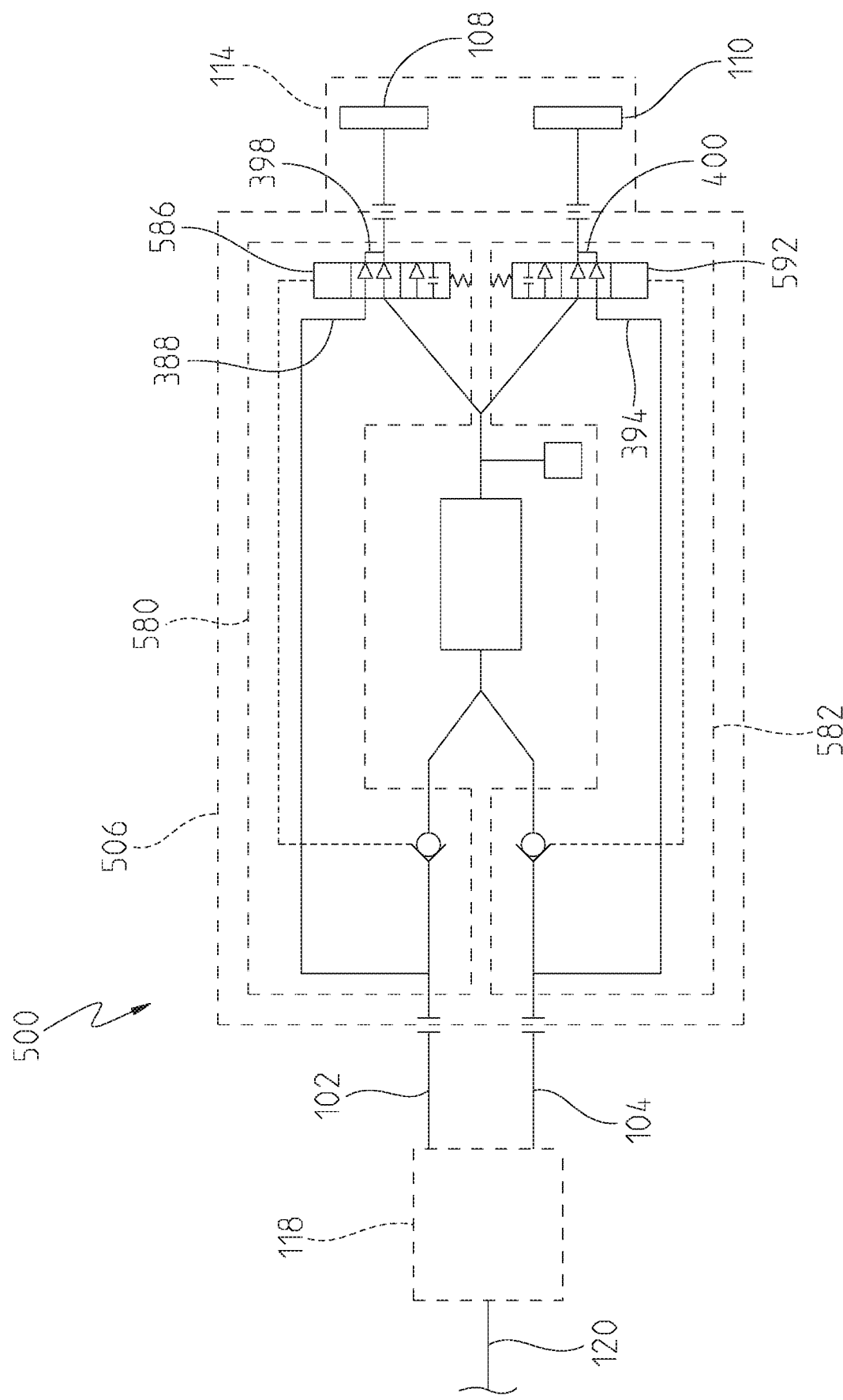
FIG. 20 is a schematic illustration of yet another illustrative showerhead system of the present disclosure.

In some embodiments, the showerhead system 300 may take different forms. As a specific example, the first pressure relief path R1 and the second pressure relief path R2 may be continuously provided regardless of whether the first valve 380 and the second valve 382 are in open or closed positions, depending on the size of the components of the manifold 306. FIG. 20 illustrates a showerhead system 500 including an illustrative manifold 506 that provides continuous relief paths. More specifically, the showerhead system 500 also includes one or more primary water supply conduits 120, a flow controller 118, a first water supply conduit 102, a second water supply conduit 104, and a showerhead spout 114 including one or more first spout outlets 108 and one or more second spout outlets 110, all of which are as described above. The manifold 506 is similar to the manifold 306 described above, except that the second valve element 586 of the first valve 580 and the second valve element 592 of the second valve 582 provide continuous relief paths regardless of position. More specifically, the second valve element 586 provides continuous fluid communication between the first relief inlet passageway 388 and the first relief outlet passageway 398, and the second valve element 592 provides continuous fluid communication between the second relief inlet passageway 394 and the second relief outlet passageway 400.

As yet another exemplary alternative embodiment, illustrative manifolds according to the present disclosure may be provided separately from a showerhead system and deliver water to various separate water delivery components. For example, a manifold may selectively deliver water to two separate showerheads, or a manifold may selectively deliver water to a showerhead and a hand shower.

Although the invention has been described in detail with reference to certain preferred embodiments, variations and modifications exist within the spirit and scope of the invention as described and defined in the following claims.

The invention claimed is:

1. A manifold for a showerhead system, the showerhead system comprising a first supply conduit for selectively delivering water to the manifold, a second supply conduit for selectively delivering water to the manifold, a first spout outlet for selectively discharging water from the showerhead system, and a second spout outlet for selectively discharging water from the showerhead system, the manifold comprising:
a first inlet configured to receive water from the first supply conduit;
a second inlet configured to receive water from the second supply conduit;
a common passageway configured to receive water from both the first inlet and the second inlet;
a flow restrictor configured to receive water from the common passageway and configured to restrict a flow rate of water in the manifold;
a first valve configured to receive water from the flow restrictor, the first valve being actuatable to a first open position and a first closed position, in the first open position the first valve permitting water to flow therethrough and in the first closed position the first valve inhibiting water from flowing therethrough;
a first manifold outlet configured to receive water from the first valve upon actuation of the first valve to the first open position, the first manifold outlet being configured to deliver water to the first spout outlet;
a second valve configured to receive water from the flow restrictor, the second valve being actuatable to a second open position and a second closed position, in the second open position the second valve permitting water to flow therethrough and in the second closed position the second valve inhibiting water from flowing therethrough; and
a second manifold outlet configured to receive water from the second valve upon actuation of the second valve to the second open position, the second manifold outlet being configured to deliver water to the second spout outlet.

2. The manifold of claim 1, further comprising a first pilot passageway configured to receive water from the first inlet and thereby actuate the first valve to the first open position.

3. The manifold of claim 2, further comprising a second pilot passageway configured to receive water from the second inlet and thereby actuate the second valve to the second open position.

4. The manifold of claim 3, further comprising a common pilot passageway configured to receive water from the common passageway and thereby (1) actuate the first valve to the first closed position when the first inlet and the first pilot passageway do not receive water from the first supply conduit; and (2) actuate the second valve to the second closed position when the second inlet and the second pilot passageway do not receive water from the second supply conduit.

5. The manifold of claim 1, further comprising a first check valve configured to receive water from the first inlet and deliver water to the common passageway, and the first check valve being configured to inhibit water in the common passageway from flowing toward the first inlet.

6. The manifold of claim 5, further comprising a second check valve configured to receive water from the second inlet and deliver water to the common passageway, and the second check valve being configured to inhibit water in the common passageway from flowing toward the second inlet.

7. A manifold for a showerhead system, the showerhead system comprising a first supply conduit for selectively delivering water to the manifold, a second supply conduit for selectively delivering water to the manifold, a first spout outlet for selectively discharging water from the showerhead system, and a second spout outlet for selectively discharging water from the showerhead system, the manifold comprising:
a first inlet configured to receive water from the first supply conduit;
a second inlet configured to receive water from the second supply conduit;
a common passageway configured to receive water from both the first inlet and the second inlet;
a flow restrictor configured to receive water from the common passageway and configured to restrict a flow rate of water in the manifold;
at least one valve configured to receive water from the flow restrictor;
a first manifold outlet configured to selectively receive water from the at least one valve; and
a second manifold outlet configured to selectively receive water from the at least one valve; and
wherein the at least one valve is actuatable to a series of positions permitting water flow selectively to the first manifold outlet, the second manifold outlet, and both the first manifold outlet and the second manifold outlet.

8. The manifold of claim 7, wherein the at least one valve is a single valve being actuatable to permit water to flow therethrough in a first position, a second position, and a third position, wherein upon actuation of the valve to the first position and the second position, the first manifold outlet is configured to deliver water to the first spout outlet, wherein upon actuation of the valve to the second position and the third position, the second manifold outlet is configured to deliver water to the second spout outlet, further comprising a first pilot passageway configured to receive water from the first inlet and a second pilot passageway configured to receive water from the second inlet, wherein (1) the valve is actuated to the first position when the first pilot passageway receives water from the first inlet and the second inlet and the second pilot passageway do not receive water from the second supply conduit; (2) the valve is actuated to the second position when the first pilot passageway receives water from the first inlet and the second pilot passageway receives water from the second inlet; and (3) the valve is actuated to the third position when the second pilot passageway receives water from the second inlet and the first inlet and the first pilot passageway do not receive water from the first supply conduit.

9. The manifold of claim 7, further comprising a first check valve configured to receive water from the first inlet and deliver water to the common passageway, and the first check valve being configured to inhibit water in the common passageway from flowing toward the first inlet.

10. The manifold of claim 9, further comprising a second check valve configured to receive water from the second inlet and deliver water to the common passageway, and the second check valve being configured to inhibit water in the common passageway from flowing toward the second inlet.

11. A showerhead system, the showerhead system being configured to couple to a first supply conduit for selectively delivering water to the showerhead system and a second supply conduit for selectively delivering water to the showerhead system, the showerhead system comprising:
a manifold, comprising:
a first inlet configured to receive water from the first supply conduit;
a second inlet configured to receive water from the second supply conduit;
a common passageway configured to receive water from both the first inlet and the second inlet;
a flow restrictor configured to receive water from the common passageway and configured to restrict a flow rate of water in the manifold;
a first valve configured to receive water from the flow restrictor, the first valve being actuatable to a first open position and a first closed position, in the first open position the first valve permitting water to flow therethrough and in the first closed position the first valve inhibiting water from flowing therethrough;
a second valve configured to receive water from the flow restrictor, the second valve being actuatable to a second open position and a second closed position, in the second open position the second valve permitting water to flow therethrough and in the second closed position the second valve inhibiting water from flowing therethrough;
a first manifold outlet configured to receive water from the first valve upon actuation of the first valve to the first open position;
a second manifold outlet configured to receive water from the second valve upon actuation of the second valve to the second open position;
a first spout outlet configured to receive water from the first manifold outlet and discharge water from the showerhead system; and
a second spout outlet configured to receive water from the second manifold outlet and discharge water from the showerhead system.

12. The showerhead system of claim 11, wherein the manifold further comprises a first pilot passageway configured to receive water from the first inlet and thereby actuate the first valve to the first open position.

13. The showerhead system of claim 12, wherein the manifold further comprises a second pilot passageway configured to receive water from the second inlet and thereby actuate the second valve to the second open position.

14. The showerhead system of claim 13, wherein the manifold further comprises a common pilot passageway configured to receive water from the common passageway and thereby (1) actuate the first valve to the first closed position when the first inlet and the first pilot passageway do not receive water from the first supply conduit; and (2) actuate the second valve to the second closed position when the second inlet and the second pilot passageway do not receive water from the second supply conduit.

15. The showerhead system of claim 11, wherein the manifold further comprises a first check valve configured to receive water from the first inlet and deliver water to the common passageway, and the first check valve being configured to inhibit water in the common passageway from flowing toward the first inlet.

16. The showerhead system of claim 15, wherein the manifold further comprises a second check valve configured to receive water from the second inlet and deliver water to the common passageway, and the second check valve being configured to inhibit water in the common passageway from flowing toward the second inlet.

17. A manifold for a showerhead system, the showerhead system comprising a first supply conduit for selectively delivering water to the manifold, a second supply conduit for selectively delivering water to the manifold, a first spout outlet for selectively discharging water from the showerhead system, and a second spout outlet for selectively discharging water from the showerhead system, the manifold comprising:
a first inlet configured to receive water from the first supply conduit;
a second inlet configured to receive water from the second supply conduit;
a common passageway configured to receive water from both the first inlet and the second inlet;
a flow restrictor configured to receive water from the common passageway and configured to restrict a flow rate of water in the manifold;
a first valve configured to receive water from the flow restrictor, the first valve being actuatable from a first unactuated position to a first actuated position, in the first actuated position the first valve permitting water to flow therethrough;
a first manifold outlet configured to receive water from the first valve upon actuation of the first valve to the first actuated position, the first manifold outlet being configured to deliver water to the first spout outlet;
a second valve configured to receive water from the flow restrictor, the second valve being actuatable from a second unactuated position to a second actuated position, in the second actuated position the second valve permitting water to flow therethrough; and
a second manifold outlet configured to receive water from the second valve upon actuation of the second valve to the second actuated position, the second manifold outlet being configured to deliver water to the second spout outlet.

18. The manifold of claim 17, further comprising a first check valve configured to receive water from the first inlet and deliver water to the common passageway, and the first check valve being configured to inhibit water in the common passageway from flowing toward the first inlet.

19. The manifold of claim 18, further comprising a second check valve configured to receive water from the second inlet and deliver water to the common passageway, and the second check valve being configured to inhibit water in the common passageway from flowing toward the second inlet.

20. The manifold of claim 7, wherein the at least one valve comprises:
a first valve configured to receive water from the flow restrictor, the first valve being actuatable to a first open position and a first closed position, in the first open position the first valve permitting water to flow therethrough and in the first closed position the first valve inhibiting water from flowing therethrough; and
a second valve configured to receive water from the flow restrictor, the second valve being actuatable to a second open position and a second closed position, in the second open position the second valve permitting water to flow therethrough and in the second closed position the second valve inhibiting water from flowing therethrough.

21. The manifold of claim 20, wherein:
the first manifold outlet is configured to receive water from the first valve upon actuation of the first valve to the first open position, the first manifold outlet being configured to deliver water to the first spout outlet; and the second manifold outlet is configured to receive water from the second valve upon actuation of the second valve to the second open position, the second manifold outlet being configured to deliver water to the second spout outlet.

* * * * *